(12) United States Patent
Kondo et al.

(10) Patent No.: US 6,233,049 B1
(45) Date of Patent: May 15, 2001

(54) THREE-DIMENSIONAL MEASUREMENT APPARATUS

(75) Inventors: Takashi Kondo, Sakai; Hideki Tanabe, Ibaraki; Makoto Miyazaki, Itaraki; Eiichi Ide, Itami; Hiroshi Uchino, Kyoto; Toshio Norita, Osaka, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/273,544

(22) Filed: Mar. 22, 1999

Related U.S. Application Data
(60) Provisional application No. 60/100,885, filed on Sep. 23, 1998.

(30) Foreign Application Priority Data

Mar. 25, 1998  (JP) .................................................. 10-076845

(51) Int. Cl.$^7$ .................................................. G01B 11/24
(52) U.S. Cl. .......................................... 356/376; 382/154
(58) Field of Search .................................... 356/376, 375, 356/372; 364/559; 250/234–236, 559.22, 559.19; 382/154, 266, 285, 286; 395/94, 119, 126

(56) References Cited

U.S. PATENT DOCUMENTS

| | | | |
|---|---|---|---|
| 4,758,093 | * 7/1988 | Stern et al. ........................... | 356/376 |
| 4,794,262 | * 12/1988 | Sato et al. ............................. | 250/560 |
| 4,882,490 | * 11/1989 | Takasaki et al. ...................... | 250/236 |
| 4,939,379 | * 7/1990 | Horn ..................................... | 250/560 |
| 4,961,155 | * 10/1990 | Ozeki et al. .......................... | 356/375 |
| 5,024,529 | * 6/1991 | Svetkoff et al. ...................... | 356/376 |
| 5,102,223 | * 4/1992 | Uesugi et al. ........................ | 356/376 |
| 5,129,010 | * 7/1992 | Higuchi et al. ........................... | 382/8 |
| 5,175,595 | * 12/1992 | Fukase ................................. | 356/387 |
| 5,362,958 | * 11/1994 | Ando ................................. | 250/208.1 |
| 5,377,011 | * 12/1994 | Kock .................................... | 356/376 |
| 5,668,631 | 9/1997 | Norita et al. .......................... | 356/376 |
| 6,049,385 | * 4/2000 | Norita et al. .......................... | 356/376 |

FOREIGN PATENT DOCUMENTS

| | | |
|---|---|---|
| 7-174536 | 7/1995 | (JP) . |
| 9-196632 | 7/1997 | (JP) . |

\* cited by examiner

*Primary Examiner*—Hoa Q. Pham
(74) *Attorney, Agent, or Firm*—Burns, Doane, Swekcer & Mathis, LLP

(57) ABSTRACT

A three-dimensional measurement device employs a slit ray projection technique to optically determine a three-dimensional image. The device offers a choice in operating modes between high-speed measurement, high-resolution measurement and large dynamic range in the depth direction, to accommodate various situations. The different modes of operation are achieved by selectively modifying one or more of the scanning speed of a projected reference beam, the readout speed of a photosensor, the line width or line spacing of the photosensor, and the number of lines per image frame.

30 Claims, 19 Drawing Sheets

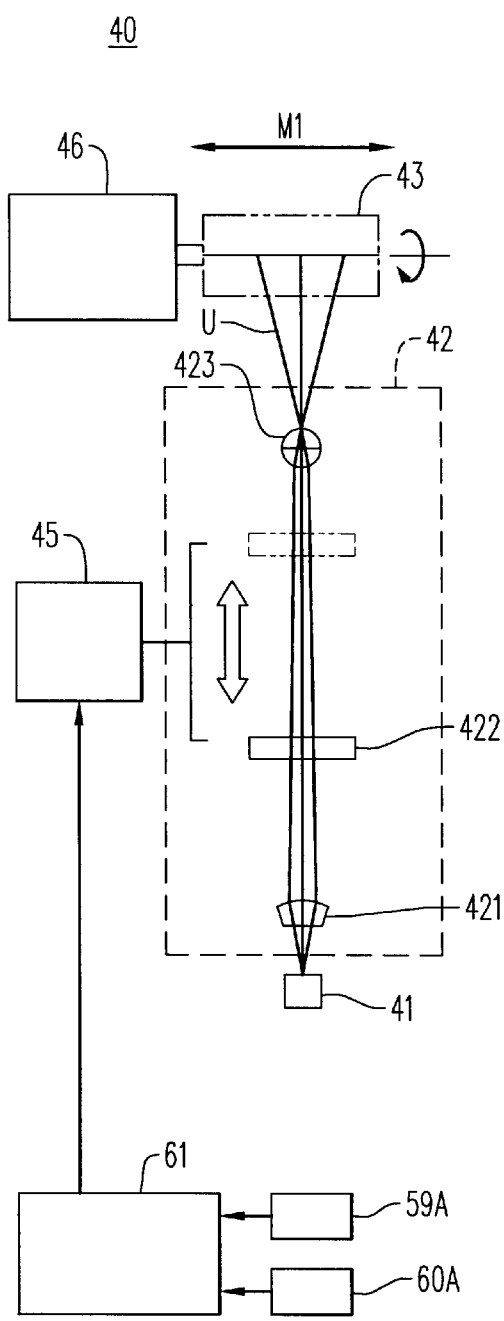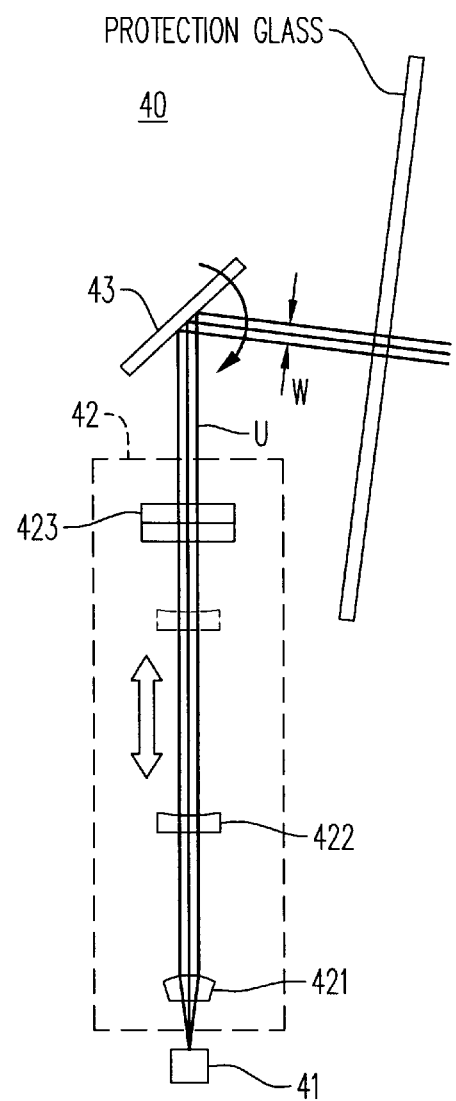
FIG. 4(a)
FIG. 4(b)

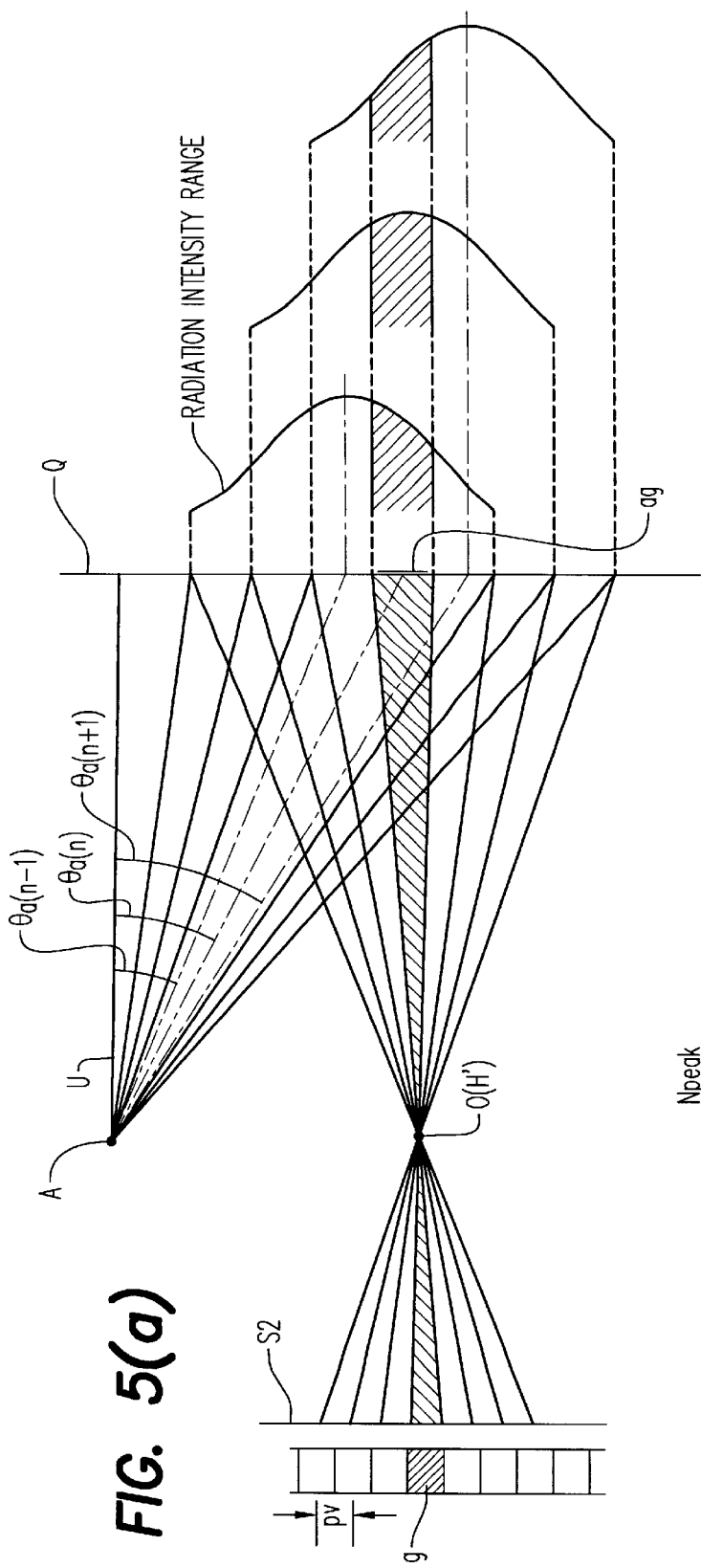
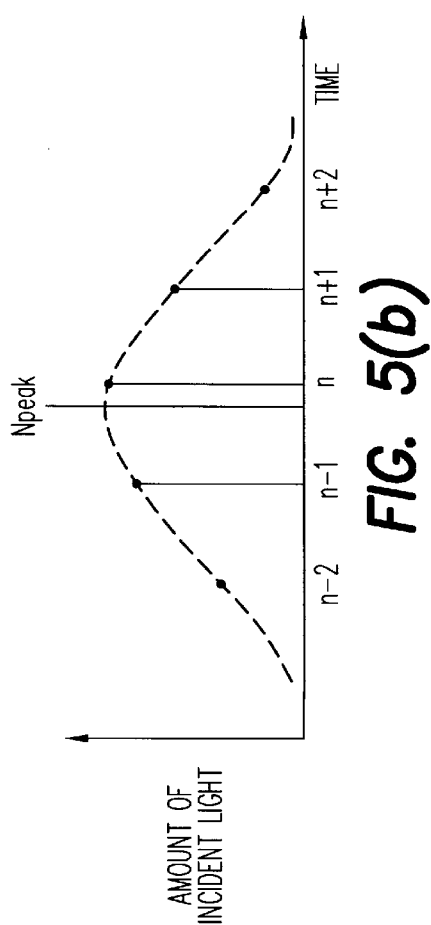
FIG. 5(a)
FIG. 5(b)

| FACTOR / OPERATION MODE | | THE NUMBER OF READOUT LINES GL | READOUT LINE WIDTH GW | LINE SPACE GT | THE NUMBER OF SHIFTS GS | SLIT RAY WIDTH GP | MEASUREING SPEED QS | MEASUREMENT RANGE QR | RESOLUTION QD | SENSITIVITY QB | MEASUREMENT AREA QE |
|---|---|---|---|---|---|---|---|---|---|---|---|
| STANDARD | | 32 | 32 | 1 | 1 | 5 | 1 | 1 | 1 | 1 | 1 |
| HIGH-SPEED | 1 | 16 | 16 | 1 | 1 | 5 | 2 | 1/2 | 1 | 1 | 1 |
| | 2 | 16 | 32 | 2 | 1 | 10 | 2 | 1 | 1/2 | 1 | 1 |
| | 3 | 32 | 32 | 1 | 2 | 5 | 2 | 1 | 1/2 | 1 | 1 |
| | 4 | 32 | 32 | 2 | 1 | 5 | 1/R | 1 | 1 | 1 | R |
| | 5 | 16 | 32 | 2 | 1 | 10 | 4 | 1 | 1/4 | 1 | 1 |
| WIDE Z | 1 | 32 | 64 | 1 | 1 | 5 | 1 | 2 | 1/2 | 1 | 1 |
| | 2 | 64 | 64 | (1)2 | 1 | 10 | 1/2 | 2 | 1 | 1 | 1 |
| HIGH SENSITIVITY | | (32)16 | 32 | 1 | 1/2 | 5 | 2 | 1 | 1/2 | 2 | 1 |
| HIGH RESOLUTION | | 32 | 32 | 2 | 2 | 10 | 1/2 | 1 | 2 | 1 | 1 |
| HIGH-SPEED WIDE Z | | 32 | 64 | | | | 2 | 2 | 1 | 1 | 1 |

FIG. 12

THREE-DIMENSIONAL MEASUREMENT APPARATUS

This disclosure is based upon, and claims priority from, provisional U.S. Application Ser. No. 60/100,885, filed Sep. 23, 1998, and Japanese Application No. 10-076845, filed Mar. 25, 1998, the contents of which are incorporated herein by reference.

FIELD OF THE INVENTION

The present invention relates to a three-dimensional measurement apparatus that measures the shape of an object in noncontacting fashion by irradiating the object with a reference beam such as a slit ray or a spot beam.

BACKGROUND OF THE INVENTION

A three-dimensional measurement apparatus that employs a slit ray projection method (also known as a light chopping method) is known in the prior art, as disclosed, for example, in Japanese Patent Unexamined Publication No. 9-196632. The slit ray projection method is a method for obtaining a three-dimensional image (range image) by optically scanning an object, and is a form of active measurement method that photographs an object by projecting a specific reference beam on it. The slit ray projection method uses a slit ray whose cross section is a straight line.

When performing a three-dimensional measurement, the purpose of the measurement can vary in different ways. There are many situations according to the purpose; for example, one may want to make the measurement at high speed and in the shortest possible time, or may want a high resolution measurement at some sacrifice of the measuring speed, or may want to measure an object having a large depth.

However, according to the prior art three-dimensional measurement apparatus, it has only been possible to make measurements for the purpose that matches the specification of the three-dimensional measurement apparatus. For example, the measuring speed, the measurable dimension in the depth direction, the resolution, etc. have been predetermined as specifications, and it has not been possible to cope with situations that require significant changes in the measuring conditions, such as when one wants to make measurements at higher speed or with a higher resolution. Accordingly, in the prior art, it has been necessary to purchase different three-dimensional measurement devices for different measurement purposes.

The present invention has been devised in view of the above problem, and it is an object of the invention to provide a three-dimensional measurement apparatus which can accommodate multiple different measurement conditions to address various measurement purposes.

SUMMARY OF THE INVENTION

A three-dimensional measurement apparatus according to the invention comprises means for irradiating a measurement target with a reference beam, means for scanning the reference beam, a photosensor for receiving light reflected from the measurement target irradiated with the reference beam, and means for repeatedly driving the photosensor during the scanning of the reference beam and thereby reading out signals output therefrom. The apparatus measures a three-dimensional shape of the measurement target based on the output signals from the photosensor. The apparatus further includes, in one embodiment, means for selecting an operation mode, and means for switching the scanning speed of the reference beam and a readout operation of the photosensor in accordance with the selected operation mode.

A three-dimensional measurement apparatus according to a second embodiment of the invention is characterized by the provision of means for selecting an operation mode, and means for switching a line width for the readout of the photosensor in accordance with the selected operation mode.

A three-dimensional measurement apparatus according to a third embodiment of the invention is characterized by means for selecting an operation mode, and means for switching line spacing for the readout of the photosensor in accordance with the selected operation mode.

A three-dimensional measurement apparatus according to yet another embodiment of the invention is characterized by means for selecting an operation mode, means for switching the scanning speed of the reference beam in accordance with the selected operation mode, means for switching a line width for the readout of the photosensor in accordance with the selected operation mode, and means for switching line spacing for the readout of the photosensor in accordance with the selected operation mode.

A three-dimensional measurement apparatus according to a further aspect of the invention is characterized by means for selecting an operation mode, means for switching the line width of an effective light receiving region of the photosensor, as well as line spacing for the readout, in accordance with the selected operation mode, and means for switching the number of lines shifted per frame for the readout of the photosensor in accordance with the selected operation mode.

A three-dimensional measurement apparatus according to another aspect of the invention is characterized by the provision of means for switching the readout operation between skipping intermediate lines and adding together the readout output signals when the number of lines shifted is more than one.

Factors describing the performance of the three-dimensional measurement apparatus include: measuring speed QS, measurement range QR which is the dynamic range in the depth direction (Z direction), resolution QD, sensitivity QB, and measurement area QE which is the dynamic range in the vertical direction (Y direction).

Parameters determining the above performance factors include: the number of lines (the number of readout lines) GL of the effective light receiving region Ae of the photosensor, the entire line width (readout line width) GW of the effective light receiving region Ae, line spacing GT which is a value obtained by dividing the line width GW by the number of lines GL, the number of shifts GS, and slit ray width GP (the width, w, of the slit ray U).

Usually, as the number of lines, GL, decreases, for example, the readout speed increases, increasing the measuring speed QS. When the line width GW is increased, the dynamic range in the depth direction (Z direction) increases, resulting in a wider measurement range QR. The resolution QD increases as the number of shifts, GS, decreases.

Depending on which performance factor is given priority, the operation mode is selected from among a standard mode, high speed mode, wide-Z mode, high sensitivity mode, high resolution mode, and high-speed wide-Z mode. Each operation mode has variations of its own. Various measurement purposes can be addressed by setting the operation mode in various ways.

BRIEF DESCRIPTION OF THE DRAWINGS

FIGS. 4a, 4b are a schematic diagram showing the configuration of a projection lens system.

FIGS. 5a, 5b are a diagram illustrating the principle of three-dimensional position calculations in the measurement system.

FIG. 12 is a diagram showing kinds of operation modes.

DETAILED DESCRIPTION

Figure 1:
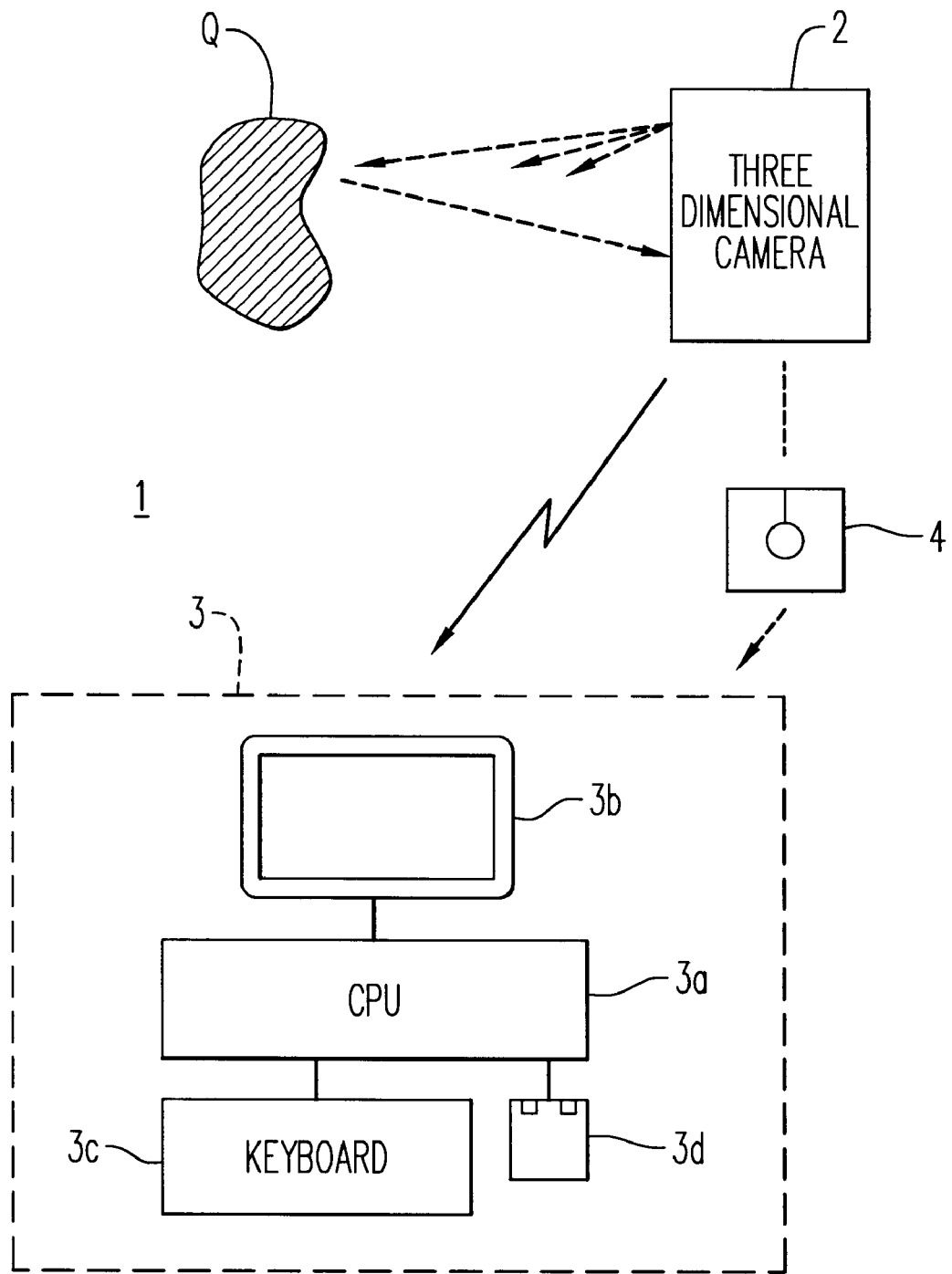
FIG. 1 is a diagram showing the configuration of a measurement system according to the present invention.

FIG. 1 is a diagram showing the configuration of a measurement system 1 according to the present invention. The measurement system 1 comprises a three-dimensional camera (range finder) 2 which makes stereoscopic measurements using a slit ray projection method, and a host 3 which processes output data from the three-dimensional camera 2. The three-dimensional camera 2 outputs a two dimensional image describing color information of an object Q and data necessary for calibration, together with measurement data (slit image data) identifying the three-dimensional positions of a plurality of sampling points on the object Q. The host 3 performs calculations to obtain the coordinates of the sampling points using a triangulation method.

The host 3 is a computer system comprising a CPU 3a, a display 3b, a keyboard 3c, a mouse 3d, etc. The CPU 3a incorporates software for processing the measurement data. Both an on-line data transfer and an off-line data transfer using a removable recording medium 4 are possible as a method of data transfer between the host 3 and the three-dimensional camera 2. Examples of the recording medium 4 include magneto-optical disks (MOs), mini-disks (MDs), and memory cards.

Figure 2A:
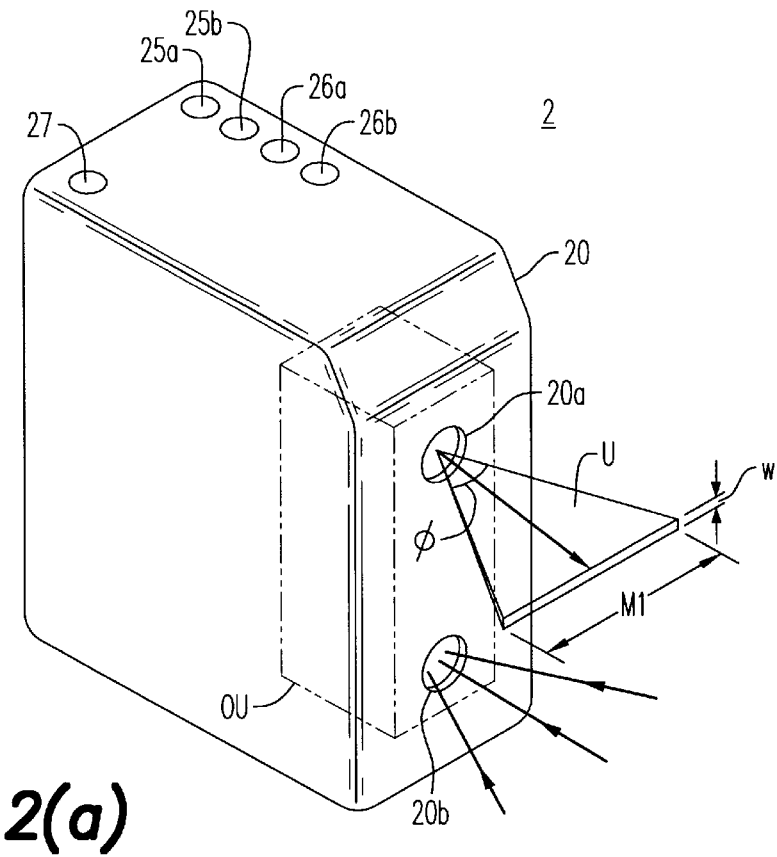
FIGS. 2a, 2b are a diagram showing an external view of a three-dimensional camera.

FIG. 2 is a diagram showing an external view of the three-dimensional camera 2. A projection window 20a and a light receiving window 20b are provided in the front panel of a housing 20. The projection window 20a is located above the light receiving window 20b. A slit ray (a strip of laser beam with a prescribed width of w) U emitted from an internal optical unit OU is passed through the projection window 20a and directed toward an object to be measured (the subject). The radiating angle φ along the lengthwise direction M1 of the slit ray U is fixed. Part of the slit ray U reflected from the surface of the object passes through the light receiving window 20b and enters the optical unit OU. The optical unit OU is equipped with a two-axis adjusting mechanism for optimizing the relative relationship between the projection axis and the light receiving axis.

Figure 2B:
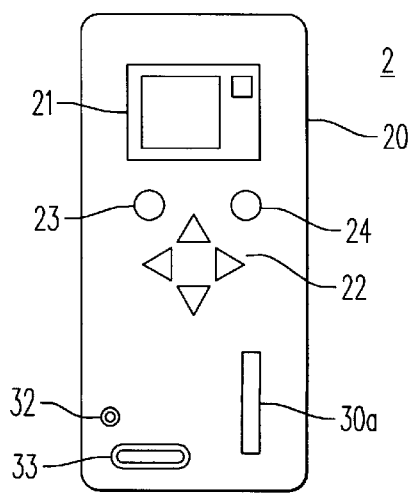

On the top panel of the housing 20 are provided zooming buttons 25a and 25b, manual focusing buttons 26a and 26b, and a shutter button 27. As shown in FIG. 2(b), a liquid crystal display 21, cursor buttons 22, a select button 23, a cancel button 24, analog output terminals 32, a digital output terminal 33, and an insertion slot 30a for the recording medium 4 are provided on the rear panel of the housing 20.

The liquid crystal display (LCD) 21 is used as an electronic viewfinder as well as an operation screen display means. The camera operator can set up the shooting mode by using the buttons 22 to 24 on the rear panel. In particular, the operation mode is set up by using the select button 23. Measurement data is output from the analog output terminal 32, and a two dimensional image signal is output, for example, in the NTSC format from the analog output terminal 32. The digital output terminal 33 is, for example, a SCSI terminal.

Figure 3:
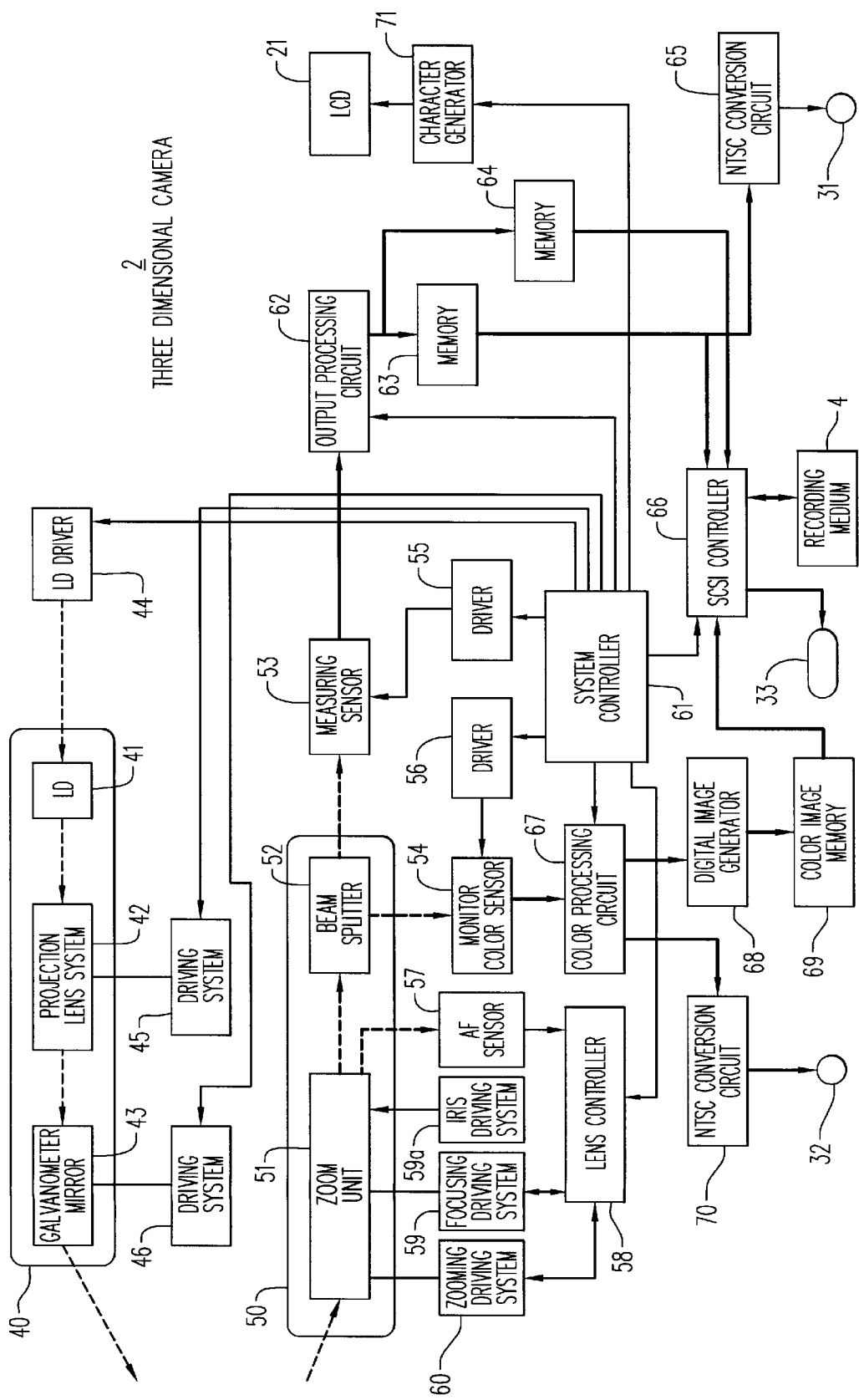
FIG. 3 is a diagram showing the functional configuration of the three-dimensional camera.

FIG. 3 is a block diagram showing the functional configuration of the three-dimensional camera 2. In the figure, solid-line arrows indicate electrical signal flows, and dotted-line arrows show light paths. The three-dimensional camera 2 includes two optical systems 40 and 50, one for projection and the other for light reception, which together constitute the optical unit OU. In the optical system 40, a laser beam with a wavelength of 685 nm emitted from a semiconductor laser (LD) 41 is passed through a projection lens system 42 to form a slit ray U which is deflected by a galvanometer mirror (scanning means) 43. A driver 44 for the semiconductor laser 41, a driving system 45 for the projection lens system 42, and a driving system 46 for the galvanometer mirror 43 are controlled by a system controller 61.

In the optical system 50, incident light converged by a zoom unit 51 is split by a beam splitter 52. Light in the oscillation wavelength region of the semiconductor laser 41 is directed to a measuring sensor 53. Light in the visible spectrum region is directed to a monitor color sensor 54. The sensor 53 and the color sensor 54 are both CCD area sensors. The zoom unit 51 is of the internal focusing type, and a portion of the incident light is used for auto focusing (AF). The AF function is implemented using an AF sensor 57, a lens controller 58, and a focus driving system 59. A zoom driving system 60 is provided for motor-driven zooming. An iris driving system 59a is provided to control the iris aperture.

Imaging information captured by the sensor 53 is transferred to an output processing circuit 62 in synchronism with a clock from a driver 55. Measurement data associated with each pixel of the sensor 53 is generated by the output processing circuit 62 and stored in memories 63 and 64. Thereafter, when the operator directs an output of data, the measurement data is output in the prescribed format via a SCSI controller 66 or an NTSC conversion circuit 65, or stored on the recording medium 4. The analog output terminal 32 or the digital output terminal 33 is used for online output of the measurement data. Imaging information captured by the color sensor 54 is transferred to a color processing circuit 67 in synchronism with a clock from a driver 56. The imaging information subjected to color processing is output via an NTSC conversion circuit 70 and via the analog output terminal 32, or is quantized in a digital image generator 68 and stored in a color image memory 69. After that, the color image data is transferred from the color image memory 69 to the SCSI controller 66, and is output via the digital output terminal 33 or stored on the recording medium 4 by being associated with the measurement data. The color image is an image with the same angle of view as the range image captured by the sensor 53, and is used as reference information during application processing at the host 3. Processing that utilizes the color information includes, for example, processing for generating a three-dimensional geometric model by combining multiple sets of measurement data having different camera viewpoints, processing for decimating unnecessary vertexes of the three-dimensional geometric model, etc. The system controller 61 issues instructions to a character generator 71 to display proper characters and symbols on the screen of the LCD 21.

FIG. 4 is a schematic diagram showing the construction of the projection lens system 42. FIG. 4(a) is a front view, and FIG. 4(b) is a side view. The projection lens system 42 consists of three lenses, that is, a collimator lens 421, a variator lens 422, and an expander lens 423. Optical processing is performed in the following sequence on the laser beam emitted from the semiconductor laser 41 to obtain the suitable slit ray U. First, the beam is collimated by the collimator lens 421. Next, the beam diameter of the laser beam is adjusted by the variator lens 422. Finally, the beam is expanded along the slit length direction (slit scanning direction) M1 by the expander lens 423.

The variator lens 422 is provided so that the slit ray U of width corresponding to three or more pixels is projected on the sensor 53 regardless of the shooting distance and the shooting angle of view. Under directions of the system controller 61, the driving system 45 moves the variator lens 422 in such a manner as to maintain the width, w, of the slit ray U constant on the sensor 53. The zoom unit 51 at the light receiving side moves in interlocking fashion with the variator lens 422. Further, under directions of the system controller 61, the width, w, of the slit ray U is controlled according to the operation mode described hereinafter.

When the slit length is expanded prior to the deflection by the galvanometer mirror 43, distortion of the slit ray U can be reduced more effectively than when the expansion is done after the deflection. Further, the galvanometer mirror 43 can be reduced in size by disposing the expander lens 423 in the final stage of the projection lens system 42, that is, at a position closer to the galvanometer mirror 43.

Figure 24A:
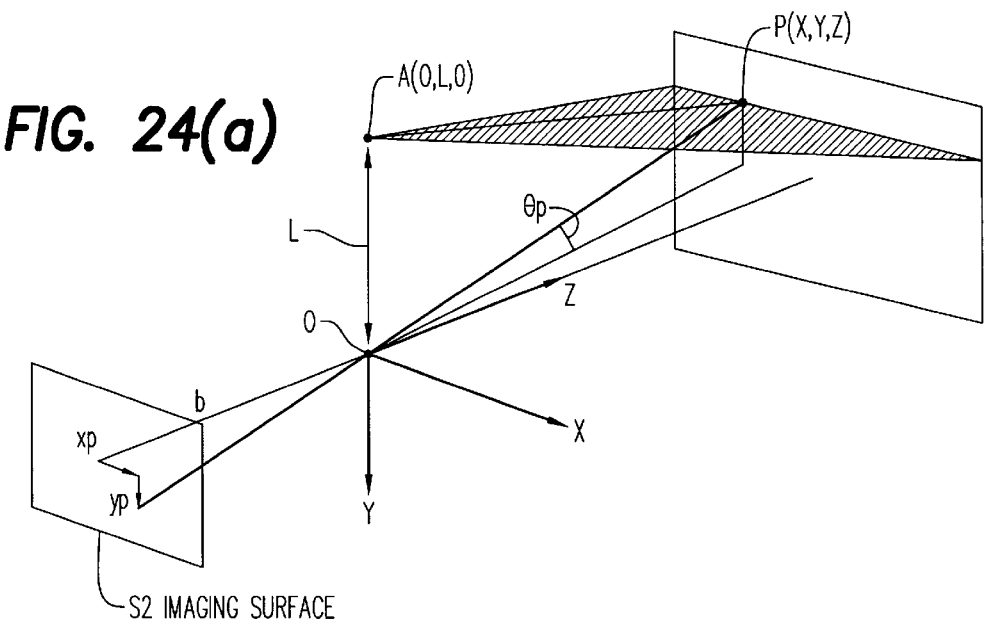
FIGS. 24a, b, c are a diagram for explaining the principle of measurement according to the slit ray projection method.
Figure 24B:
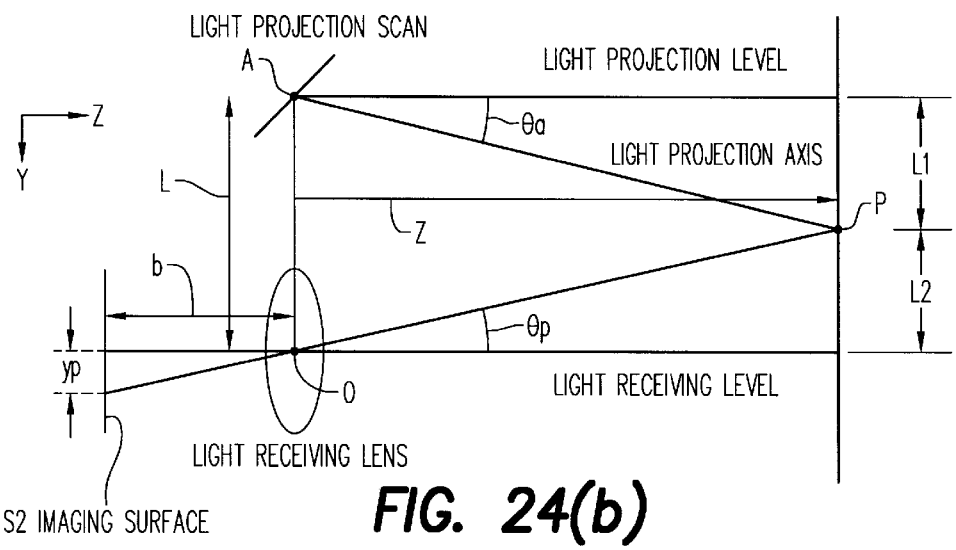
Figure 24C:
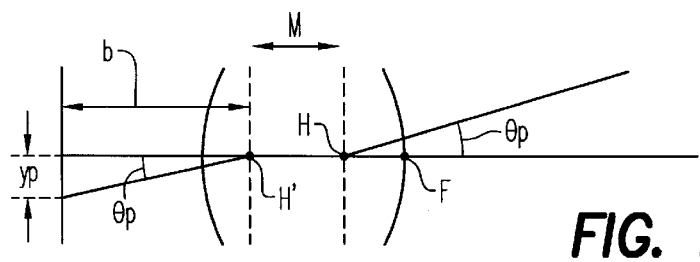

FIG. 5 is a diagram illustrating the principle of three-dimensional position calculations in the measurement system 1, FIG. 23 is a diagram illustrating an outline of the slit ray projection method, and FIG. 24 is a diagram for explaining the principle of measurement according to the slit ray projection method. In FIG. 5, elements corresponding to those in FIGS. 23 and 24 are designated by the same reference characters.

The slit ray U, wide enough to cover a plurality of pixels on an imaging surface S2 of the sensor 53, shines on the object Q. The width of the slit ray U is set equal to that of five pixels in standard mode, but the width is varied according to the operation mode. For example, when line spacing is set to "2" in high speed mode, wide Z mode, etc., the width w is set equal to the width of 10 pixels. The slit ray U is deflected to scan the object Q. The slit ray U is moved from the top toward the bottom of the imaging surface S2 shown in FIG. 5. In the standard mode, the moving speed of the slit ray U is set so that the slit ray U moves on the imaging surface S2 by one pixel pitch pv in one sampling cycle, but the moving speed is varied according to the operation mode. For example, when the number of shifts GS described later is set to "2" in high speed mode, wide Z mode, etc., the slit ray U moves by two-pixel pitch (2pv) in one sampling cycle. At the end of each sampling cycle, optical-to-electrical converted information for one frame is output from the sensor 53.

When attention is paid to one particular pixel g on the imaging surface S2, effective incident light data is obtained from five samplings out of the N samplings performed during the scanning. The timing (temporal centroid Npeak: the time when the amount of incident light on the pixel g reaches a maximum) at which the optical axis of the slit ray U passes the object surface region ag opposing the pixel g of interest, is obtained by interpolating between the incident light data of the five samplings. In the example of FIG. 5(b), the amount of incident light is maximum at a timing intermediate between the n-th sampling and the immediately preceding (n−1)th sampling. The position (coordinates) of the object Q is calculated based on the relationship between the direction of the slit ray radiation and the direction of the incident slit ray on the pixel of interest at the above obtained timing. This achieves a measurement with a resolution higher than the resolution defined by the pixel pitch pv on the imaging surface.

The amount of incident light on the pixel g depends on the reflectance of the object Q. However, the relative ratio between the incident light amounts obtained from the five samplings is constant regardless of the absolute amount of incident light. That is, the lightness or darkness of the object color does not affect the measurement accuracy.

In the measurement system 1 of the present embodiment, the three-dimensional camera 2 outputs the incident light data obtained from the five samplings to the host 3 as measurement data for each pixel g of the sensor 53, and the host 3 calculates the coordinates of the object Q based on the measurement data. The output processing circuit 62 (see FIG. 3) in the three-dimensional camera 2 is responsible for generating the measurement data associated with each pixel g.

Figure 6:
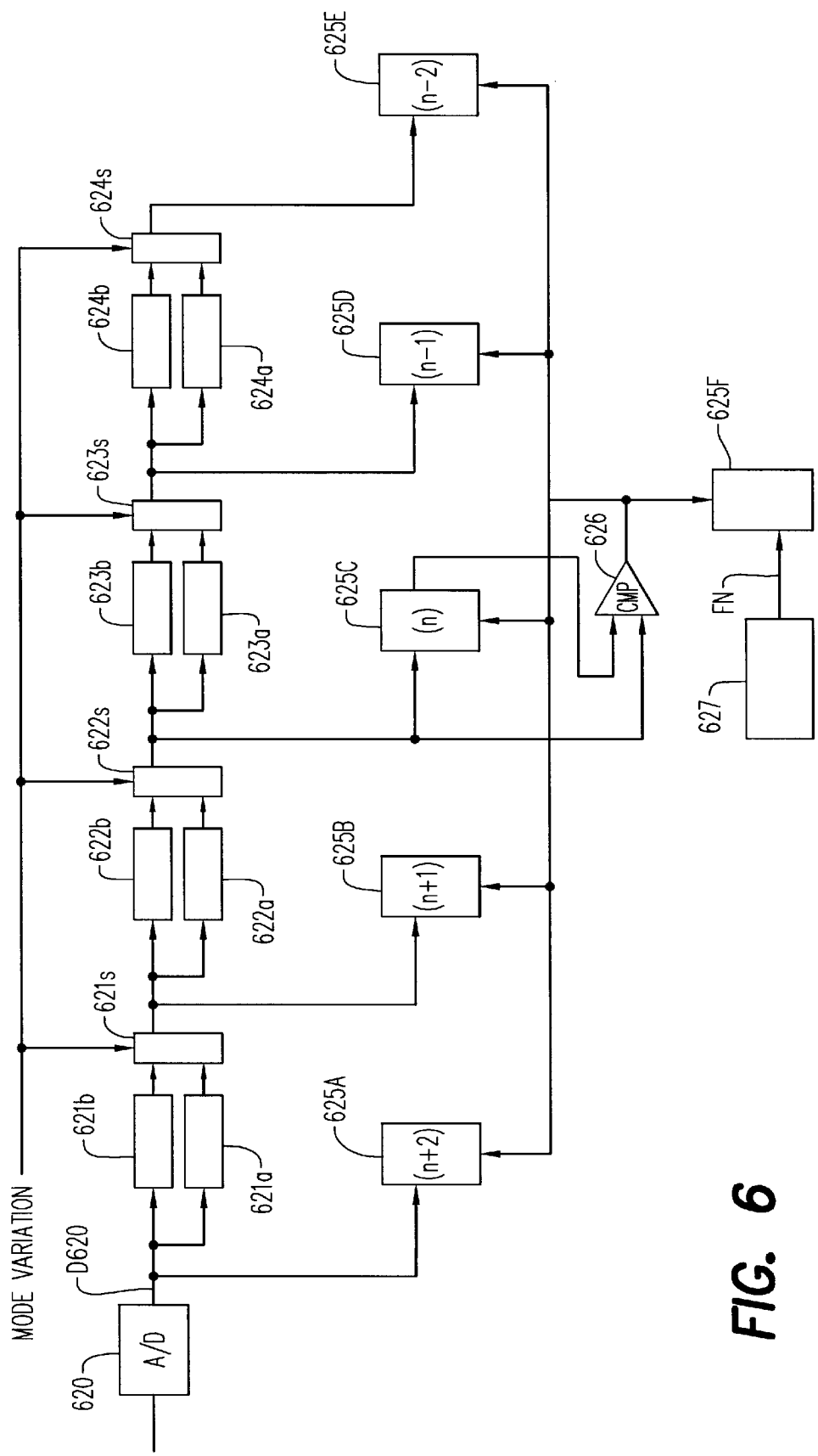
FIG. 6 is a block diagram of an output processing circuit.
Figure 7:
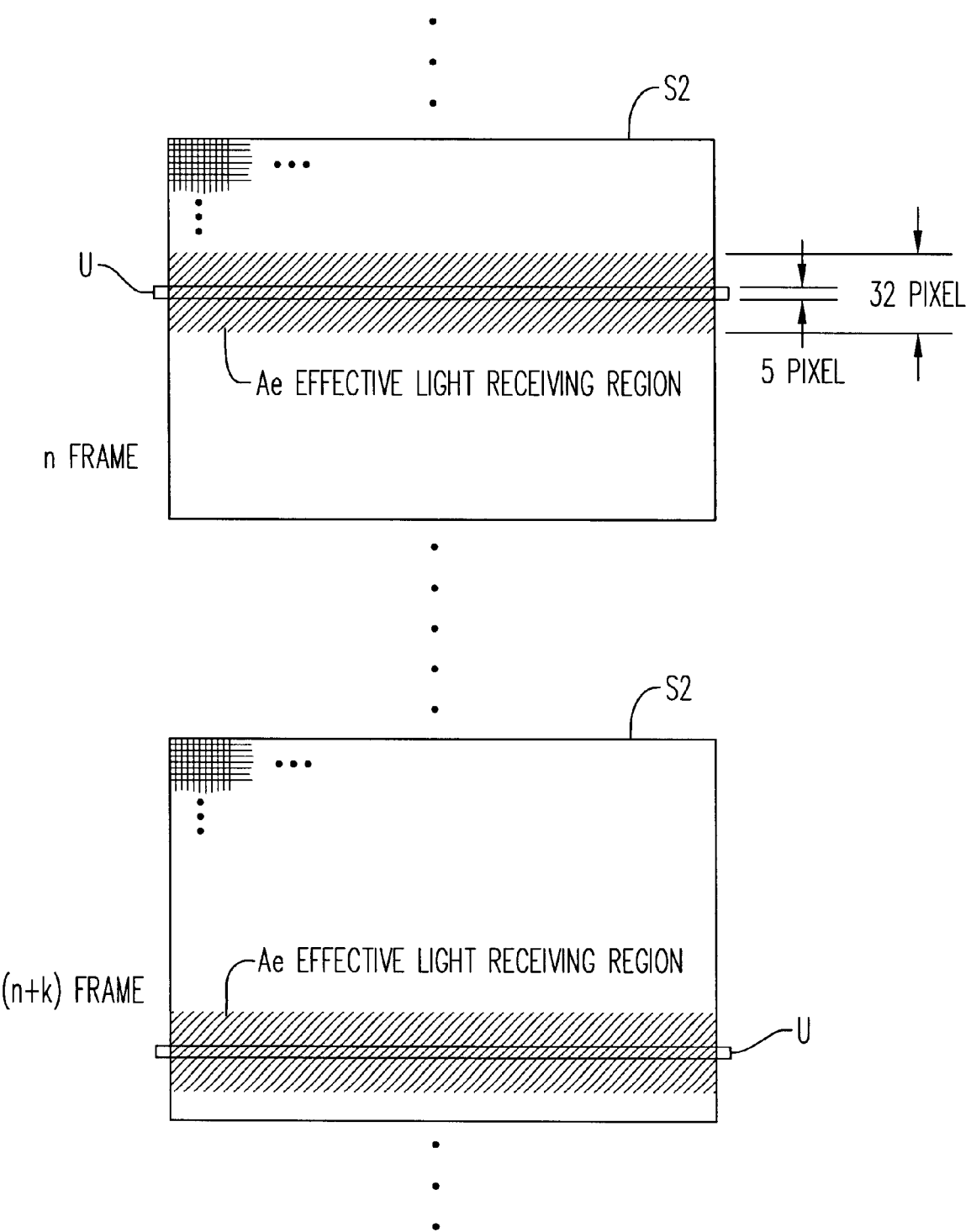
FIG. 7 is a diagram showing a sensor readout range.
Figure 8:
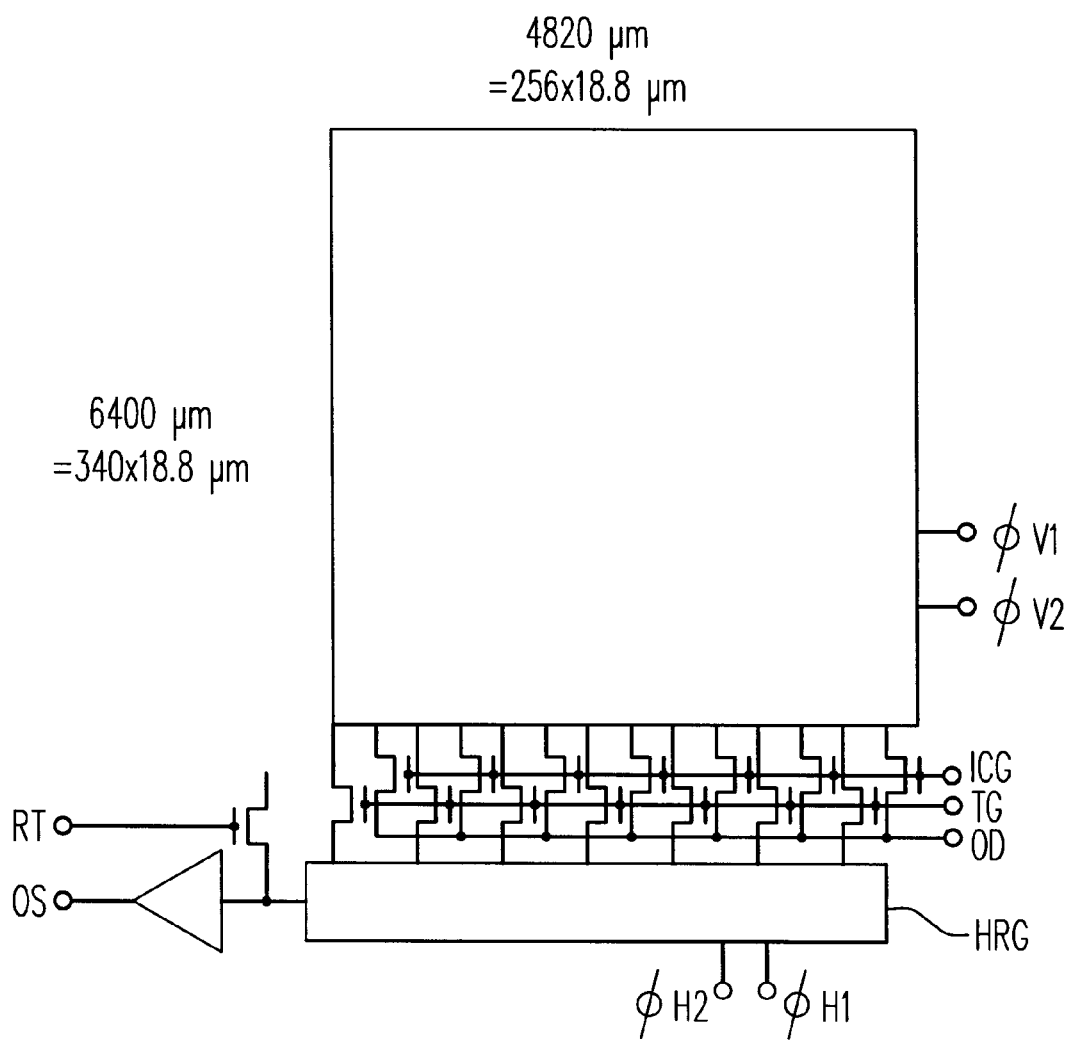
FIG. 8 is a diagram showing an example of a CCD area sensor configuration employing an interline transfer structure.

FIG. 6 is a block diagram of the output processing circuit 62, FIG. 7 is a diagram showing the reading region of the sensor 53, and FIG. 8 is a diagram showing an example of a CCD area sensor configuration employing an interline transfer structure.

The output processing circuit 62 comprises: an AD converter 620 for converting an optical-to-electrical converted signal of each pixel g, output from the sensor 53, into 8-bit incident light data; four sets of frame delay memories, 621a to 624a and 621b to 624b, connected in series; selectors 621s to 624s; five memory banks 625A to 625E for storing the effective incident light data obtained from five samplings; a memory band 625F for storing the frame number (sampling number) FN for which the incident light data is maximum; a comparator 626; a generator 627 indicating the frame number FN; and a memory control means, not shown, for performing control such as addressing the memory banks 625A to 625F. Each of the memory banks 625A to 625F has a capacity capable of storing incident light data equivalent to the number of sampling points (i.e., the number of effective pixels on the sensor 53).

The AD converter 620 outputs incident light data D620 for 32 lines per frame serially in the order in which the pixels are arranged. The four frame delay memories, 621a to 624a and 621b to 624b, are provided to introduce data delays; by so doing, for each pixel g of interest, incident light data for five frames can be stored simultaneously in the memory banks 625A to 625E. The four frame delay memories, 621a to 624a and 621b to 624b, are each a FIFO having a capacity of 31 (=32−1) lines or 15 (=16−1) lines, respectively. The selectors 621s to 624s select the frame delay memories 621a to 624a or 621b to 624b according to the operation mode of the camera.

The readout of one frame from the sensor 53 is performed not on the entire imaging surface S2, but only on the effective light receiving region (a zonal image) Ae, comprising a portion of the imaging surface S2, as shown in FIG. 7, to achieve high speed reading. The number of pixels (i.e., the number of lines GL) in the shift direction (vertical direction) of the effective light receiving region Ae is "32" in the standard mode, but it is set to "16", "64", etc. according to the operation mode. The effective light receiving region Ae shifts by a prescribed number of pixels per frame as the slit ray U is deflected (scanned). The number of shifts, GS, per frame is equal to one pixel in the standard mode, but it is set equal to two pixels for other operation modes.

As described above, the number of lines, GL, and the number of shifts, GS, of the effective light receiving region Ae are changed according to the mode. The control for changing these parameters is accomplished by the system controller 61 outputting instruction signals to the driver 55 responsible for the measuring sensor 53. The driver 55 drives the sensor 53 by controlling the number of lines, GL, and the number of shifts, GS, of the effective light receiving region Ae based on the instruction signals from the system controller 61.

The method of reading only a portion of the image captured by a CCD area sensor is disclosed in Japanese Patent Unexamined Publication No. 7-174536, and the same method is used in the present embodiment to read only the effective light receiving region Ae from the sensor 53 and also to read only the necessary lines in the effective light receiving region Ae.

An outline of the method will be described with reference to FIG. 8. Until the starting line of the effective light receiving region Ae of the sensor 53 is reached, the accumulated charges are dumped into overflow drains OD. In the effective light receiving region Ae, a one-shift signal is input to transfer gates, and the charges in the lowermost vertical register are read into the bottom horizontal register HRG; thereafter, by application of a horizontal shift signal, images are output one at a time. Charges accumulated after the last line of the effective light receiving region Ae are dumped into the overflow drains OD.

Accordingly, in an operation mode in which every other line is read out, control is performed so that charges on every other line are dumped into the overflow drains OD during the reading of the effective light receiving region Ae. Controlling the number of shifts, GS, of the effective light receiving region Ae is accomplished by shifting the starting line of the effective light receiving region Ae accordingly. In a mode in which every pair of two adjacent lines are added together, for example, in a high sensitivity mode, the horizontal register HRG is read out after inputting two shift signals to the transfer gates TG.

When reading out the sensor 53, if the number of lines, GL, of the effective light receiving region Ae is "32", the 31-line delay outputs from the frame delay memories 621a to 624a are selected, and if the number of lines, GL, is "16", the 15-line delay outputs from the frame delay memories 621b to 624b are selected. Further, when a mode in which the number of lines, GL, of the effective light receiving region Ae is set to "64" is included, frame delay memories for 63-line delays are also provided, and provisions are made to select their outputs.

The incident light data D620 of the pixel g of interest, output from the AD converter 620, is compared, after being delayed by two frames, with the maximum value of the past incident light data D620 of the same pixel g stored in the memory bank 625C. When the delayed incident light data D620 (the output of the frame delay memory 622a or 622b) is greater than the maximum value of the past, the output of the AD converter 620 and the outputs of the frame delay memories 621a to 624a or 621b to 624b at that instant in time are stored in the respective memory banks 625A to 625E, thus updating the contents of the memory banks 625A to 625E. At the same time, the frame number FN corresponding to the incident light data D620 stored in the memory bank 625C is stored in the memory bank 625F.

More specifically, when the amount of incident light on the pixel g of interest reaches a maximum in the n-th frame (n<N), then data of the (n+2)th frame is stored in the memory bank 625A, data of the (n+1)th frame is stored in the memory bank 625B, data of the n-th frame is stored in the memory bank 625C, data of the (n−1)th frame is stored in the memory bank 625D, data of the (n−2)th frame is stored in the memory bank 625E, and n is stored in the memory bank 625F.

Next, the operation of the three-dimensional camera 2 and host 3 will be described along with the measuring procedure. The following description assumes the number of measuring sampling points to be 200×231. That is, the number of pixels along the slit length direction on the imaging surface S2 is 231, and the effective number of frames, N, is 200.

By viewing the color monitor image displayed on the LCD 21, the user (operator) determines the position and orientation of the camera to set the angle of view. At this time, zooming is performed, if needed. In the three-dimensional camera 2, the iris adjustment for the color sensor 54 is not performed, and the color monitor image is displayed by controlling the exposure using an electronic shutter function. This is to admit as much incident light as possible into the sensor 53 by opening the iris aperture.

Figure 9:
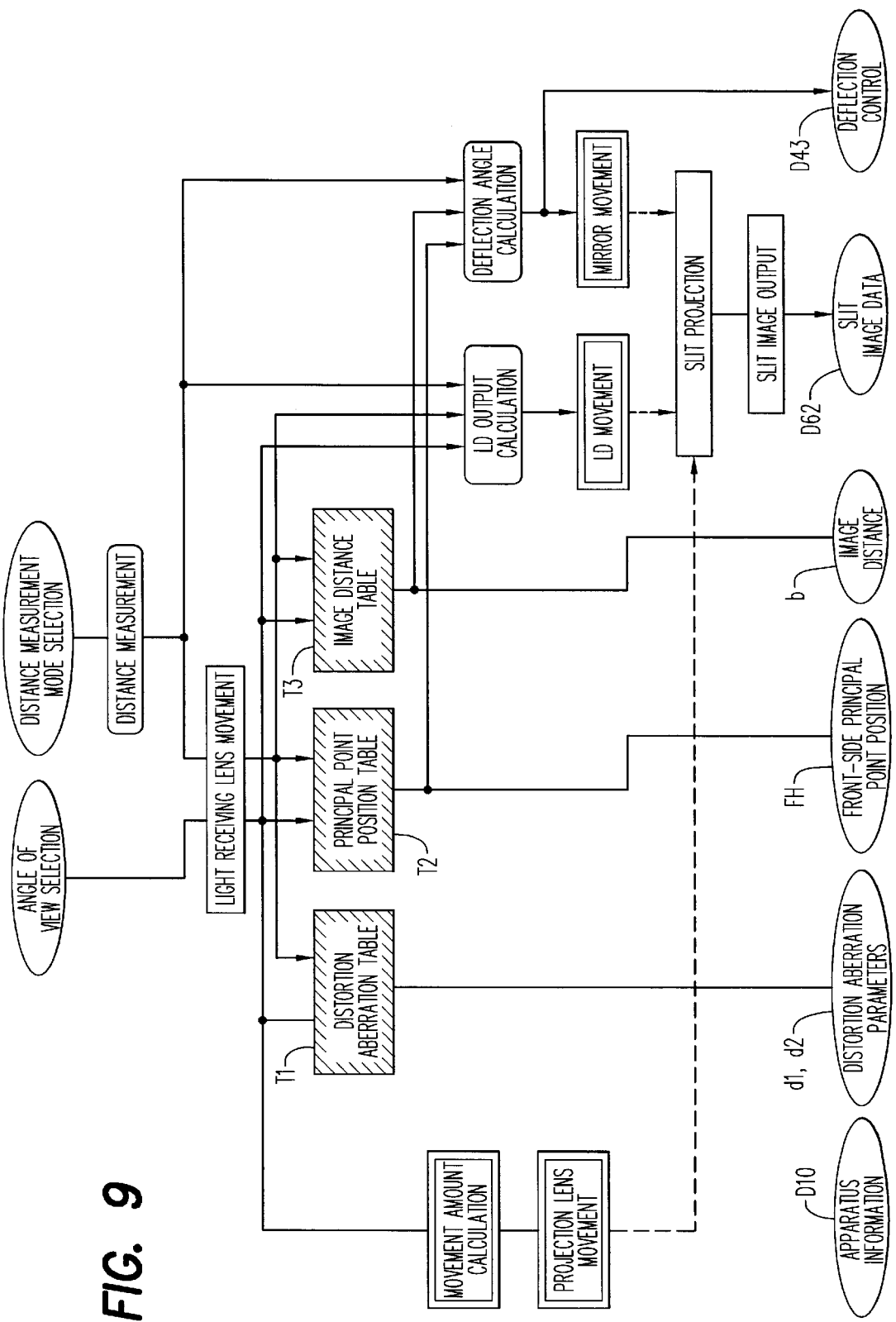
FIG. 9 is a diagram showing the flow of data in the three-dimensional camera.
Figure 10:
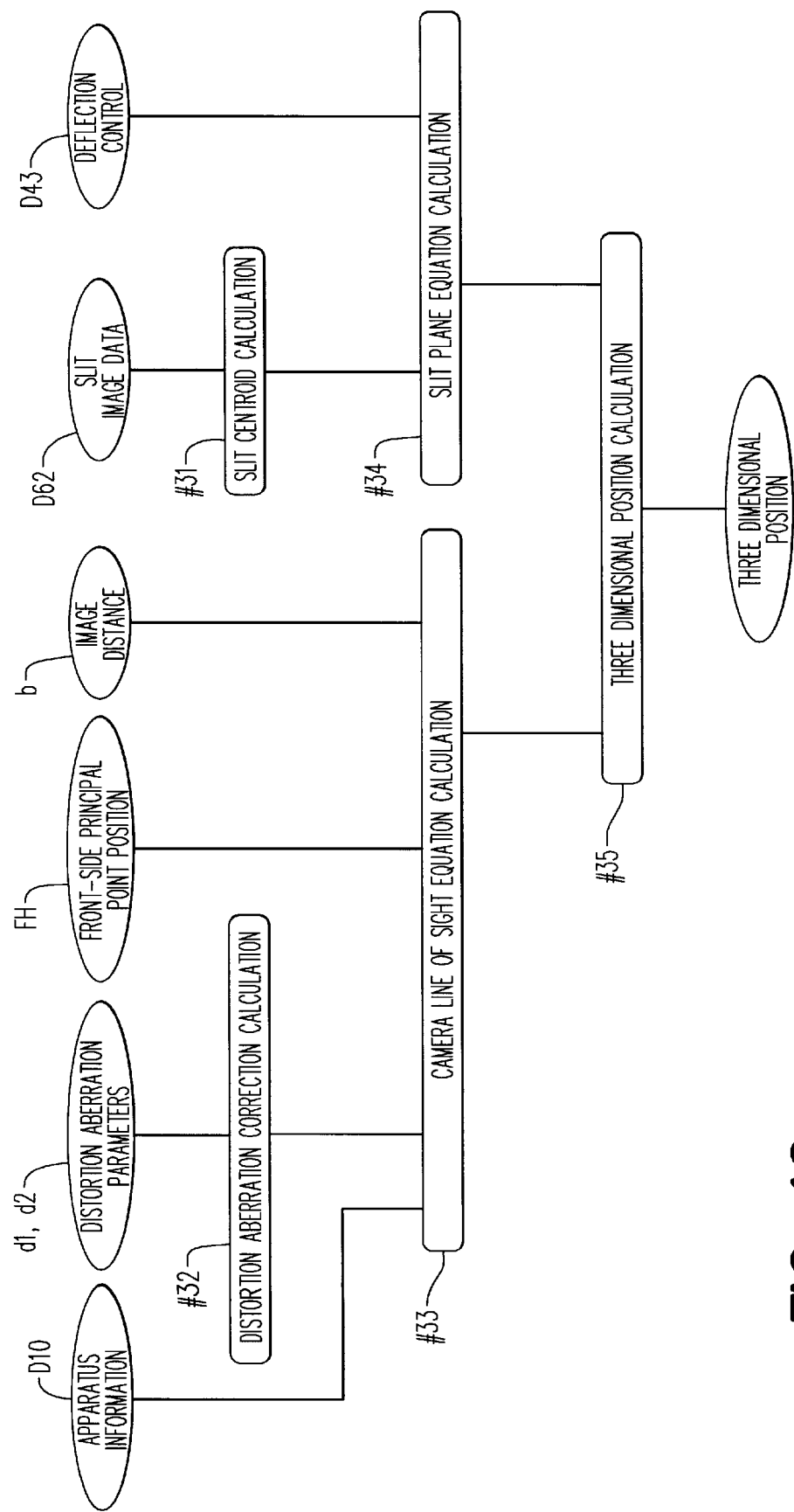
FIG. 10 is a diagram showing the flow of data in a host.
Figure 11:
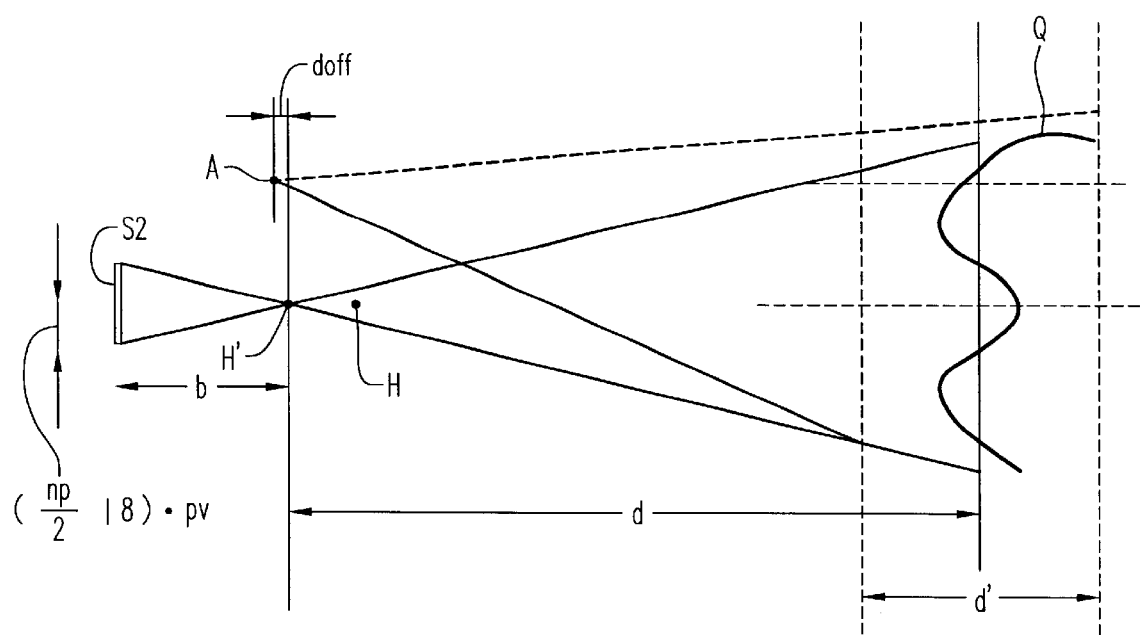
FIG. 11 is a diagram showing the relationship between each point in an optical system and an object.

FIG. 9 is a diagram showing the flow of data in the three-dimensional camera 2, FIG. 10 is a diagram showing the flow of data in the host 3, and FIG. 11 is a diagram showing the relationship between each point in the optical system and the object Q.

In accordance with the angle of view selection, i.e., zooming operation, performed by the user, a variator section 514 in the zoom unit 51 is moved. Further, manual or automatic focusing is performed by moving a focusing section 512. During the focusing process, an approximate object distance $d_0$ is measured. In response to such lens movements at the light receiving side, the amount of movement for the variator lens 422 at the projection side is calculated by an arithmetic circuit (not shown) and, based on the result of the calculation, the variator lens 422 is moved in a controlled manner.

The system controller 61 reads the output (feed amount Ed) of a focusing encoder 59A and the output (zoom calibration value fp) of a zooming encoder 60A via the lens controller 58. Within the system controller 61, a distortion aberration table T1, a principal point position table T2, and an image distance table T3 are referenced, and imaging condition data appropriate to the feed amount Ed and zoom calibration value fp is output to the host 3. The imaging condition data here refers to distortion aberration parameters (lens distortion correction coefficients d1 and d2), front principal point position FH, and image distance b. The front principal point position FH is expressed as the distance between the front end point F of the zoom unit 51 and the front principal point H. Since the front end point F is fixed, the front principal point H can be determined by the front principal point position FH.

The system controller 61 determines the output (laser intensity) of the semiconductor laser 41 and the deflection conditions (scan start angle, scan end angle, and deflection angular velocity) of the slit ray U by computation. First, assuming that a plane object is located at an approximate object distance $d_0$, the projection angle is set so that the reflected light is received at the center of the sensor 53. The pulsed lasing for laser intensity computation hereinafter described is produced for this projection angle.

Next, the laser intensity is computed. In the computation of the laser intensity, safety precautions are essential as it may affect a human body. First, pulsed lasing is produced with a minimum intensity LDmin, and the output of the sensor 53 is latched. The ratio between the latched signal [Son(LDmin)] and the optimum level Styp is calculated to set a tentative laser intensity LD1.

$$LD1 = LDmin \times Styp / MAX[Son(LDmin)]$$

where MAX[Son(LDmin)] is the maximum latched value among the sensed pixels.

Next, pulsed lasing is again produced this time with the laser intensity LD 1, and the output of the sensor 53 is latched. If the latched signal [Son(LD1)] is equal or close to the optimum level Styp, then LD1 is determined as the laser intensity LDs. Otherwise, a tentative laser intensity LD1 is set using the laser intensity LD1 and MAX[Son(LD1)], and the output of the sensor 53 is compared with the optimum level Styp. The process of tentative setting of the laser intensity and verification of its appropriateness is repeated until the output of the sensor 53 is brought within tolerance limits. Here, the output of the sensor 53 is latched with respect to the entire imaging surface S2. The reason is that if passive distance computation by means of AF is used, it is difficult to estimate the incident position of the slit ray U with high accuracy. The CCD integration time in the sensor 53 is one field time (for example, $\frac{1}{60}$ second), which is longer than the integration time at the time of actual measurement. Therefore, by pulsed lasing, the sensor output equivalent to that at the time of actual measurement is obtained.

Next, the object distance d is determined by triangulation from the projection angle and the incident position of the slit ray U at the time when the laser intensity is determined. Finally, the deflection conditions are computed based on the thus-determined object distance d. When computing the deflection conditions, an offset, doff, in the Z direction (see FIG. 24) between the back principal point H' of the light receiving system as the reference point for measuring the object distance d and the start point A of the projecting light, is considered. Further, an overscan by a prescribed amount (for example, an amount equivalent to 8 pixels) is performed in order to secure the same measurable distance range d' at edge portions in the scanning direction as at the center portion. The scan start angle th1, the scan end angle th2, and the deflection angular velocity ω are expressed by the following equations.

$$th1 = \tan^{-1}[\beta \times pv(np/2+8)+L)/(d+doff)] \times 180/p$$

$$th2 = \tan^{-1}[-\beta \times pv(np/2+8)+L)/(d+doff)] \times 180/p$$

$$\omega = (th1 - th2)/np$$

where

β: Image magnification (=d/effective focal distance freal)

pv: Pixel pitch np: Effective pixel count along Y direction on imaging surface S2

L: Baseline length

Using the thus computed conditions, actual lasing is produced to scan the object Q (slit projection), and measurement data (slit image data) D62 for five frames per pixel, obtained by the output processing circuit 52, is sent to the host 3. At the same time, apparatus information D10 regarding the deflection conditions (deflection control data), the specifications of the sensor 53, etc. is also sent to the host 3.

As shown in FIG. 10, the host 3 performs a slit centroid calculation #31, a distortion aberration correction calculation #32, a camera line of sight equation calculation #33, a slit plane equation calculation #34, and a three-dimensional position calculation #35, thereby computing the three-dimensional position (coordinates X, Y, Z) of each of the 200×231 sampling points. Each sampling point is located where the camera's line of sight (a straight line between the sampling point and the back principal point H') intersects the split plane (the optical axis plane of the slit ray U irradiating the sampling point).

FIG. 12 is a diagram showing the kinds of operation modes. Factors describing the performance of the measurement system 1 include: measuring speed QS which is proportional to the reciprocal of the time required for the measurement (shooting); measurement range QR which is the dynamic range in the depth direction (Z direction); resolution QD; sensitivity QB, and measurement area QE which is the dynamic range in the vertical direction (Y direction).

These performance factors are determined by: the number of lines (the number of readout lines), GL, of the effective light receiving region Ae; the entire line width (readout line width), GW, of the effective light receiving region Ae; line spacing GT which is a value obtained by dividing the line width GW by the number of lines GL; the number of shifts, GS; and slit ray width GP (the width, w, of the slit ray U). When the line spacing GT is set to "2", readout may be performed every other line, or readout may be performed after adding every two lines. Reading out after adding every two lines results in the high sensitivity mode.

Trade-offs can be made between these various factors, to achieve different modes of operation that are suited to different situations. For instance, as the number of lines, GL, decreases, the readout speed increases, thereby increasing the measuring speed QS. When the line width GW is increased, the dynamic range in the depth direction (Z direction) increases, resulting in a wider measurement range QR. The resolution QD increases as the number of shifts, GS, decreases. Depending on which performance factor is given priority, the operation mode is selected from among the standard mode, high speed mode, wide Z mode, high sensitivity mode, high resolution mode, and high-speed wide Z mode. Each operation mode has various variations of its own.

Figure 13:
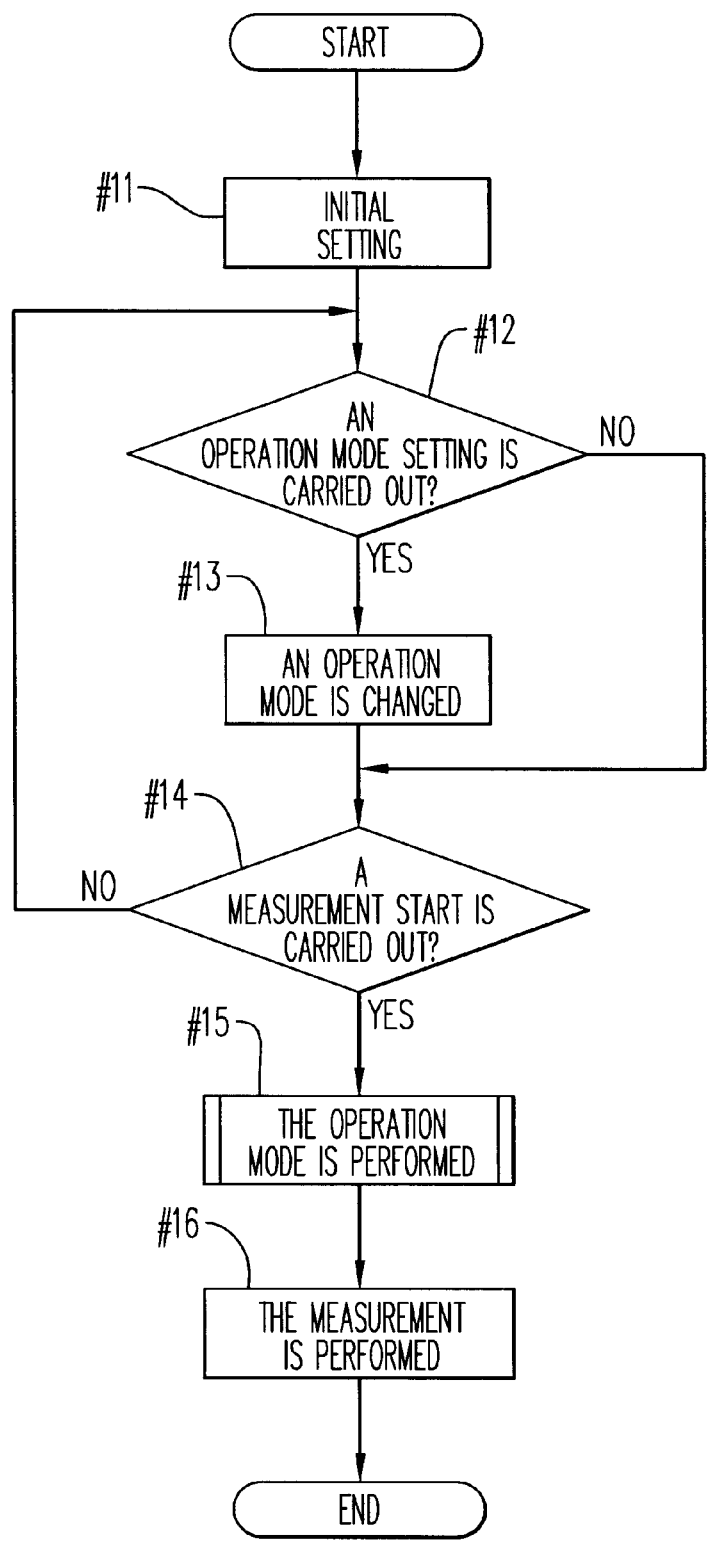
FIG. 13 is a flowchart illustrating an outline of the operation of the measurement system.
Figure 14:
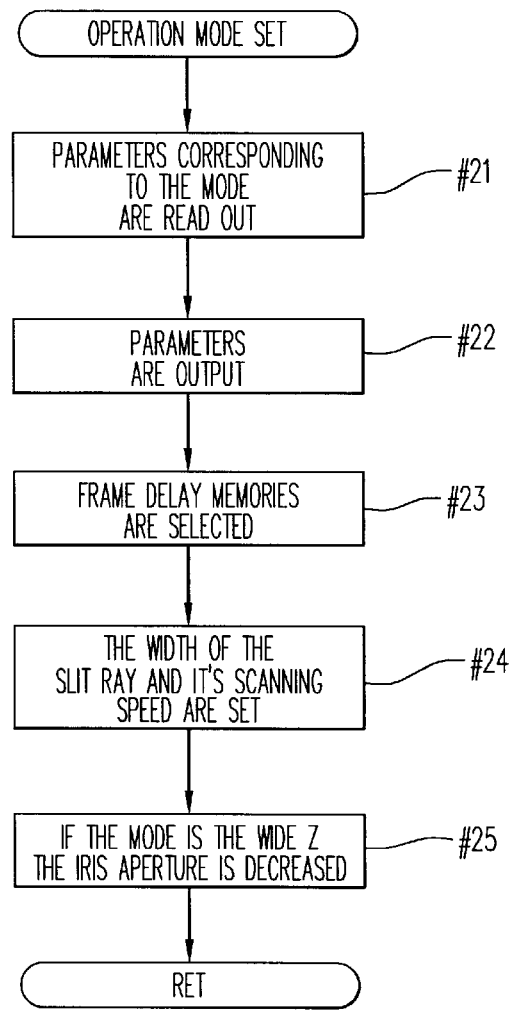
FIG. 14 is a flowchart illustrating a mode setting process.

The operation of the measurement system 1 will now be described, focusing on differences between each operation mode. FIG. 13 is a flowchart illustrating an outline of the operation of the measurement system 1, and FIG. 14 is a flowchart illustrating a mode setting process. In FIG. 13, first an initialization step is performed (#11). When mode setting operation is carried out, via operation of the mode setting buttons 22–24, the operation mode is changed (#12, 13). When a measurement start operation is carried out, the operation mode setting appropriate to the operation is performed (#14, 15). After that, the measurement is performed in the thus-set operation mode (#16).

In FIG. 14, parameters corresponding to the operation mode set by the operation of the buttons 22–24 are read out (#21). The parameters include the reading width (the effective light receiving region Ae), the line spacing GT, the number of shifts, GS, and the selection or nonselection of the high sensitivity mode, and these parameters are output to the driver 55 (#22). The parameter indicating the selection or nonselection of the high sensitivity mode is used when the line spacing GT is set to "2" and when the setting is made so that the readout is performed after adding every two lines. Instead of outputting this parameter, a signal indicating the kind of operation mode may be output. In that case, conversion must be performed within the driver 55 so that the operation appropriate to the operation mode is performed. Based on the number of lines, GL, either the frame delay memories 621a to 624a or the frame memories 621b to 624b are selected by the selectors 621c to 624c (#23).

The width, w, of the slit ray U and its scanning speed are set in accordance with the operation mode (#24). If the operation mode is the wide Z mode or the high-speed wide Z mode, the iris aperture is decreased (#25). That is, in the wide Z mode or the high-speed wide Z mode, the measuring distance range is wide and focusing must be achieved over the wide range. Decreasing the aperture serves to increase the depth of field, which facilitates focusing.

The above processing is performed by the system controller 61.

Typical examples of each operation mode will be described below.

The standard mode is the mode in which the measuring speed QS, the measurement range QR, the resolution QD, the sensitivity QB, and the measurement area QE are all set to standard conditions. In the standard mode, the number of lines, GL, is set to "32", the line width GW to "32", the line spacing GT to "1", the number of shifts, GS, to "1", and the slit ray width GP to "5", respectively, as shown in FIG. 12. In the standard mode, the measuring speed QS, the measurement range QR, the resolution QD, the sensitivity QB, and the measurement area QE are all set to "1". Other operation modes are named according to which performance factor is emphasized, compared with the standard performance factors of the standard mode.

The high speed mode is the mode in which the measurement is performed at high speed. Generally speaking, in the high speed mode, one or more of the foregoing parameters is varied relative to the standard mode. For instance, the number of lines, GL, can be reduced by one half compared with the standard mode. Alternatively, or in addition, the number of shifts, GS, can be doubled. Further, there are two ways of setting the line width GW: in one approach, the line width GW remains the same as that in the standard mode, and in the other, the line width GW is reduced by one half.

When the number of lines, GL, is reduced, the time required to read out the incident light data for one frame becomes shorter. Accordingly, the frame shift cycle can be shortened, shortening the time required to make measurements over the entire screen. When the number of shifts, GS, is increased, the number of frames required to make measurements over the entire screen is reduced, resulting in the shortening of the time required to make measurements over the entire screen. In either case, since the effective light receiving region Ae moves at high speed, the slit ray U also must be moved at high speed.

Figure 15:
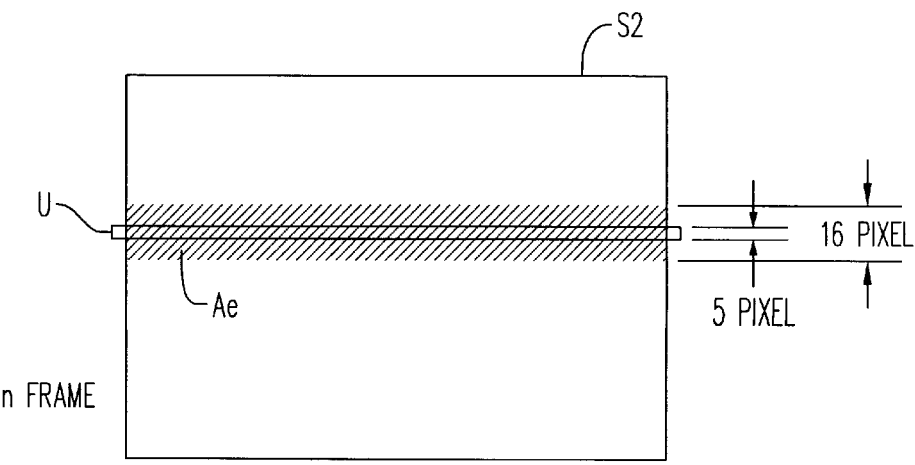
FIG. 15 is a diagram showing the sensor's effective light receiving region in high speed mode 1.
Figure 17:
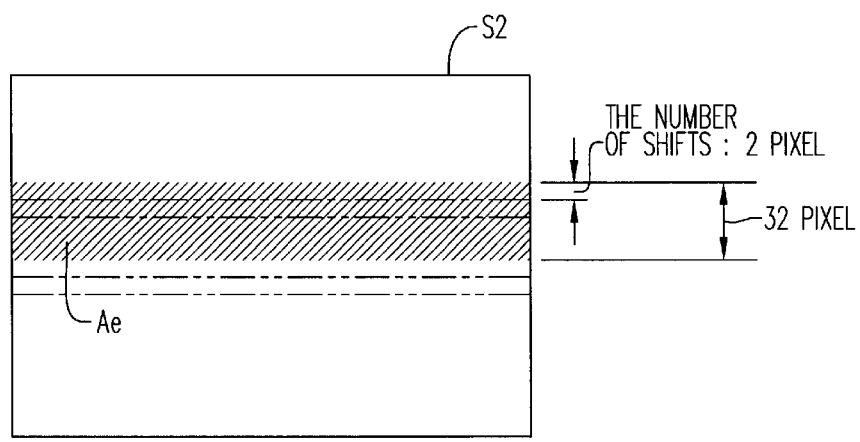
FIG. 17 is a diagram showing the effective light receiving region in high speed mode 3.
Figure 18:
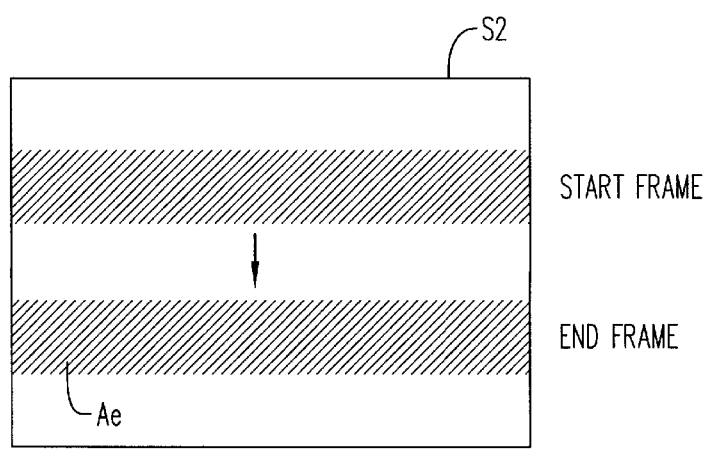
FIG. 18 is a diagram showing the effective light receiving region in high speed mode 4.

As shown in FIG. 12, there are five variations in the high speed mode, high speed mode 1 to high speed mode 5, depending on the combination of the number of lines, GL, the number of shifts, GS, etc. It is also possible to set other high speed modes by suitably setting the parameters. FIG. 15 is a diagram showing the effective light receiving region Ae (readout region) of the sensor 53 in high speed mode 1, FIG. 16 is a diagram showing the effective light receiving region Ae in high speed mode 2, FIG. 17 is a diagram showing the effective light receiving region Ae in high speed mode 3, and FIG. 18 is a diagram showing the effective light receiving region Ae in high speed mode 4.

In high speed mode 1 shown in FIG. 15, the number of pixels in the effective light receiving region Ae in the shift direction thereof is "16". The scanning speed of the slit ray U is controlled at two times that in the standard mode. High speed mode 1 has the following features compared with the standard mode:

Readout time: ½ (Measuring speed is doubled)
Measurement range: ½
Resolution: Same That is, high speed mode 1 is effective when placing emphasis on the resolution QD rather than the measurement range QR.

Figure 16:
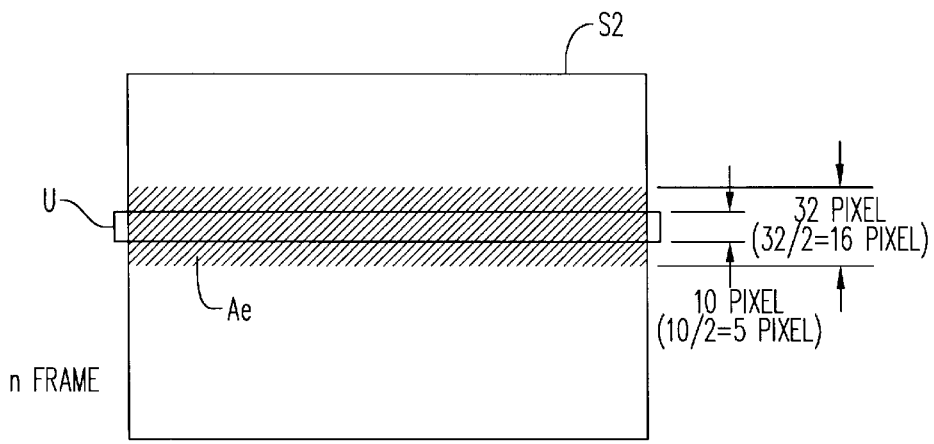
FIG. 16 is a diagram showing the effective light receiving region in high speed mode 2.

In high speed mode 2 shown in FIG. 16, the line width GW of the effective light receiving region Ae, that is, the pixel width in the shift direction, is "32", but the line spacing GT is "2", that is, every other pixel is skipped; therefore, the number of lines, GL, that is, the number of pixels which provide incident light data, is reduced by half to "16". The slit ray width GP in high speed mode 2 is "10", but since half of that is skipped, the number of pixels which provide incident light data is "5". High speed mode 2 has the following features compared with the standard mode:

[0074]

Readout time: ½
Measurement range: Same
Resolution: ½

That is, high speed mode 2 is effective when placing emphasis on the measurement range QR rather than the resolution QD.

[0075]

In high speed mode 3 shown in FIG. 17, the number of lines, GL, and the line width GW of the effective light receiving region Ae are both "32", but the number of shifts, GS, is "2", so that the effective light receiving region Ae is shifted by two lines at a time. This reduces the number of input frames, and the total measuring time is thus reduced. The slit ray U is also controlled to move by two lines when switching from one frame to the next. High speed mode 3 has the following features compared with the standard mode:

Readout time: ½
Measurement range: Same
Resolution: ½

In high speed mode 4 shown in FIG. 18, the number of lines, GL, and the line width GW of the effective light receiving region Ae are both "32", and the number of shifts, GS, is "1", but measurements are made, not over the entire area of the imaging surface S2 of the sensor 53, but over only portions thereof. The measurement area QE, therefore, becomes smaller. The scanning range of the slit ray U is also set accordingly. Denoting the number of frames in the standard mode by N, the number of frames in high speed mode 4 by N', and defining R=N'/N, then the features of high speed mode 4 compared with the standard mode are expressed using R, as follows:

Readout time: R
Measurement range: Same
Resolution: Same
Measurement area: R

To implement high speed mode 4, provisions are made in step #22 in the flowchart of FIG. 14 so that the start frame number and end frame number are output to the driver 55, and also the scan start position and scan end position of the slit ray U are set.

Other high speed modes can be obtained by combining aspects of any two or more of the foregoing modes. For example, the table of FIG. 12 illustrates high speed mode 5, which is effectively a combination of mode 2 and mode 3. In this mode, the line spacing GT=2 and the number of lines GL=16, as in mode 2. In addition, the number of shifts per readout GS=2, as in mode 3. Consequently, the measuring speed Q2 is four times that which is obtained in the standard mode. Other high speed modes can be combined in such a manner to achieve similar results.

Figure 19:
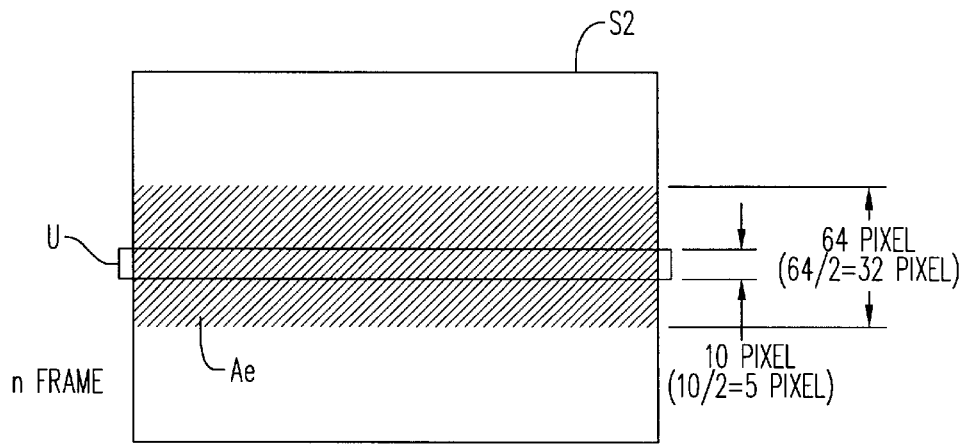
FIG. 19 is a diagram showing the effective light receiving region in wide Z mode 1.
Figure 20:
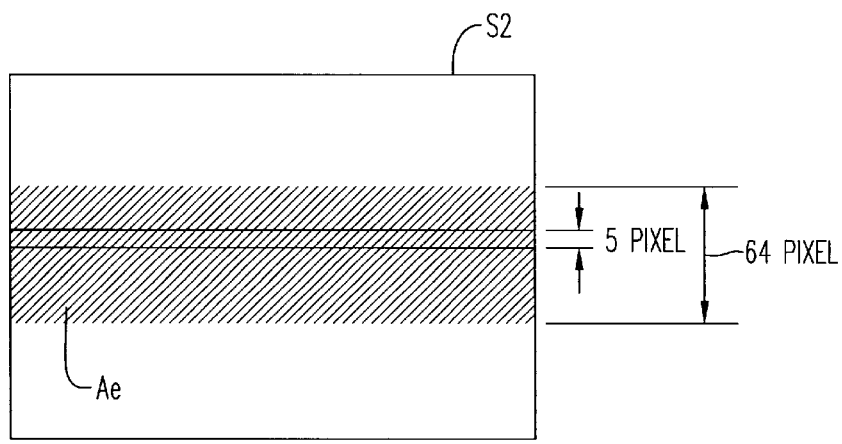
FIG. 20 is a diagram showing the effective light receiving region in wide Z mode 2.

Next, the wide Z mode will be described. The wide Z mode is the operation mode that provides a wider measurement range in the depth direction. In the wide Z mode, the line width GW is doubled compared with the standard mode. FIG. 19 is a diagram showing the effective light receiving region Ae in wide Z mode 1, and FIG. 20 is a diagram showing the effective light receiving region Ae in wide Z mode 2.

In wide Z mode 1 shown in FIG. 19, the line width GW of the effective light receiving region Ae is "64", but since every other pixel is skipped, the number of pixels which provide incident light data is "32". The slit ray width GP in wide Z mode 1 is "10", but since half of that is skipped, the number of pixels which provide incident light data is "5". Wide Z mode 1 has the following features compared with the standard mode:

Readout time: Same
Measurement range: Doubled
Resolution: ½

That is, wide Z mode 1 is effective when it is desired to increase the measurement range QR.

In wide Z mode 2 shown in FIG. 20, the number of lines, GL, and the line width GW of the effective light receiving region Ae are both "64", which is two times as great as in the standard mode. The scanning speed of the slit ray U is one half of that in the standard mode. Wide Z mode 2 has the following features compared with the standard mode.

Readout time: Doubled
Measurement range: Doubled
Resolution: Same

Figure 21:
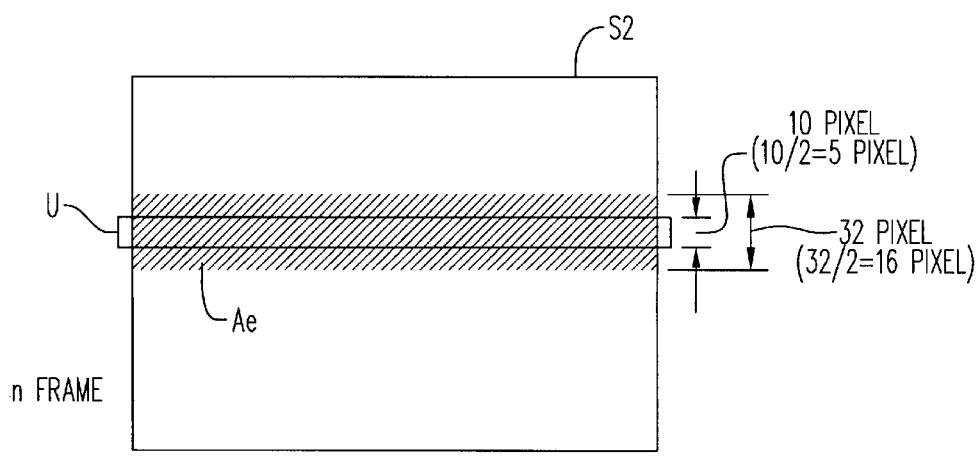
FIG. 21 is a diagram showing the effective light receiving region in high sensitivity mode.

Next, the high sensitivity mode will be described. The high sensitivity mode is the operation mode that increases the sensitivity of the sensor 53. FIG. 21 is a diagram showing the effective light receiving region Ae in the high sensitivity mode.

In FIG. 21, the line width GW of the effective light receiving region Ae is "32", but since every pair of two adjacent pixels are added together, the number of lines, GL, that is, the number of pixels which provide incident light data, is "16". The slit ray width GP in the high sensitivity mode is "10", but since every two pixels are added together, the number of pixels which provide incident light data is "5". The scanning speed of the slit ray U is two times that in the standard mode. The high sensitivity mode has the following features compared with the standard mode:

Readout time: ½
Measurement range: Same
Resolution: ½
Sensitivity: Doubled

Figure 22:
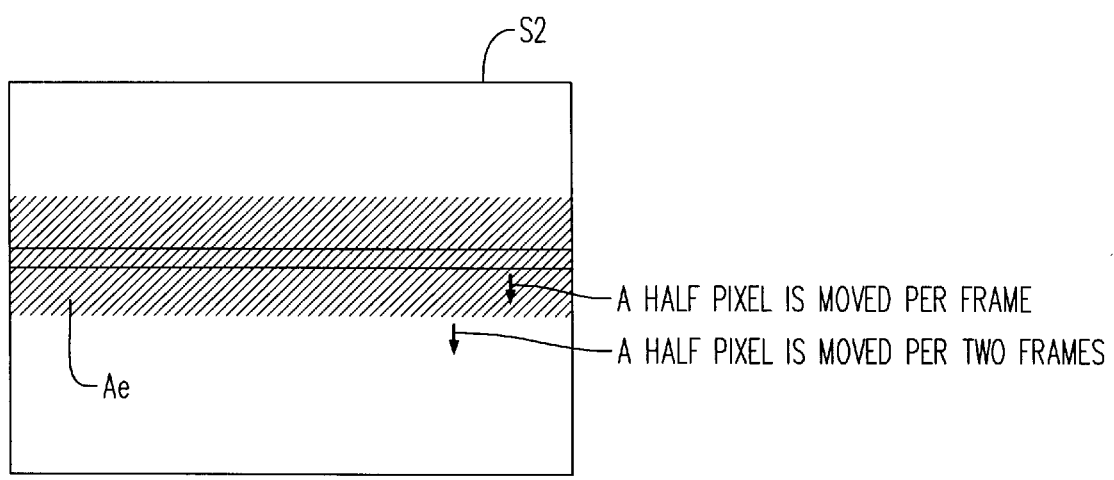
FIG. 22 is a diagram showing the effective light receiving region in high resolution mode.
Figure 23A:
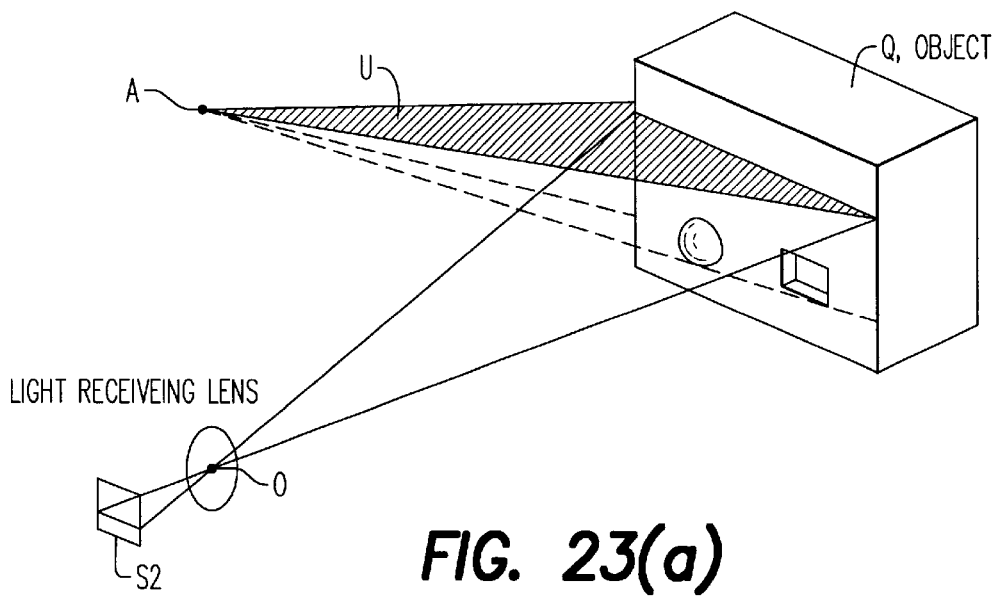
FIGS. 23a, b, c, d are a diagram illustrating an outline of a slit ray projection method.
Figure 23B:
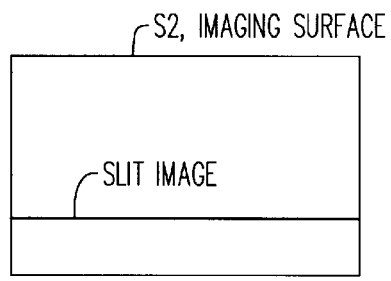
Figure 23C:
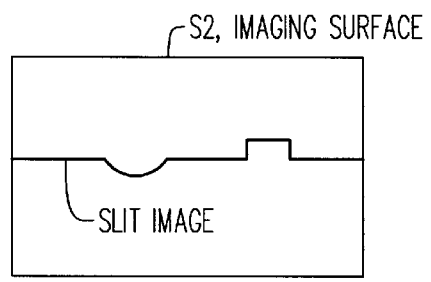
Figure 23D:
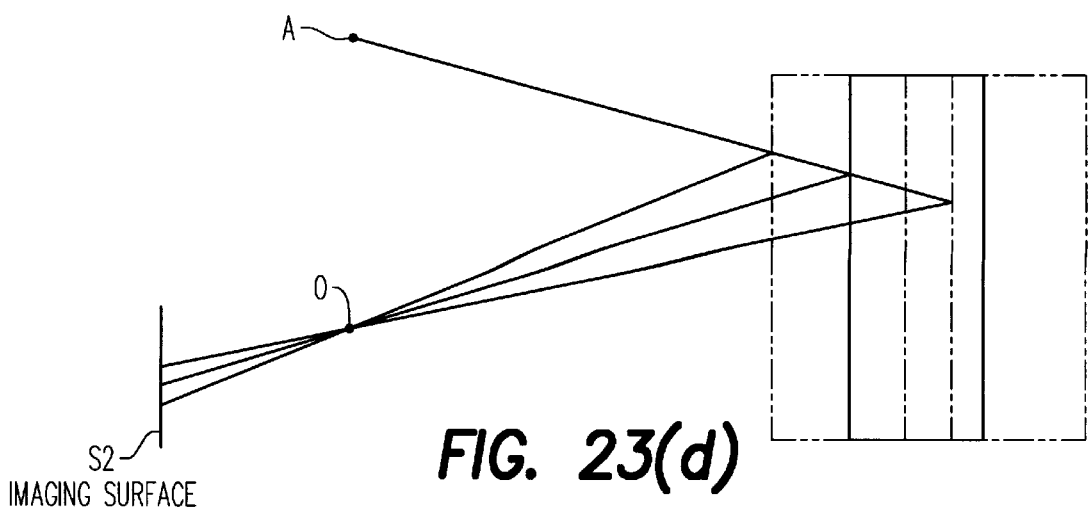

Next, the high resolution mode will be described. The high resolution mode is the operation mode that provides a higher resolution. FIG. 22 is a diagram showing the effective light receiving region Ae in the high resolution mode.

In FIG. 22, the number of lines, GL, and the line width GW of the effective light receiving region Ae are both "32", but the number of shifts, GS, is ½. That is, the scanning speed of the slit ray U is one half of that in the standard mode, and the amount of frame shift is one pixel for every two frames. Since data is read out every time the slit ray U moves by one half the pixel pitch pv, the timing at which the slit ray U passes each pixel can be detected with accuracy that is twice as high. The high resolution mode has the following features compared with the standard mode:

Readout time: Doubled
Measurement range: Same
Resolution: Doubled

To implement the high resolution mode, the setting should be made in step #22 in the flowchart of FIG. 14 so that the amount of frame shift is one pixel for readout of two frames, and in step 24 so that the slit ray U moves by half pixel pitch for every readout of one frame. In the output processing circuit 62, the frame delay memories 621$a$ to 624$a$ are selected, which is the same as in the standard mode.

Controlling the number of lines, GL, the line width GW, and the number of shifts, GS, of the effective light receiving region Ae of the sensor 53 is accomplished by the system controller 61 outputting corresponding instruction signals to the driver 55. Controlling the scanning speed (deflection speed) of the slit ray U is accomplished by the system controller 61, which outputs an instruction signal to the driving system 46 and thereby drives the galvanometer mirror 43. The width, w, of the slit ray U is switched between 5-pixel width and 10-pixel width on the imaging surface S2 of the sensor 53 by changing the variator lens 422 or the collimator lens 421, or by varying their positions.

According to the above embodiment, when one desires to shorten the measuring time, or wants an increased depth of measurement or desires to increase the resolution or sensitivity, the measurement appropriate to the needs can be accomplished by switching the operation mode according to the purpose. Furthermore, in selecting the operation mode, various settings can be made by considering the measurement conditions and the tradeoffs involved, for example, an increased measuring time is allowed, a decreased depth of measurement is allowed, a decreased resolution is allowed, a decreased measurement area is allowed, and so on.

In the above embodiment, the sharing of functions between the three-dimensional camera 2 and the host 3 can be changed in various ways. Further, the three-dimensional camera 2 and the host 3 may be combined into one unit, for example, by incorporating the functions of the host 3 into the three-dimensional camera 2. The above embodiment has been described dealing with the case where the slit ray U is scanned, but the present invention is also applicable in cases where a spot beam is scanned in a two dimensional manner.

In the above embodiment, the setting details of the operation mode, the details of combinations, the configuration of the output processing circuit 62 and the processing details, as well as the configuration of the entire measurement system 1 or a portion thereof, its circuitry, the processing details, the sequence of processing, processing timings, the setting details and set values, etc., can be modified or changed as necessary without departing from the spirit and scope of the present invention.

What is claimed is:

1. A three-dimensional measurement apparatus comprising:
    an irradiation unit that irradiates and scans a measurement target with a reference beam;
    a photosensor for receiving light reflected from a measurement target irradiated with said reference beam;
    a reading unit that repeatedly reads out signals from said photosensor during the scanning of said reference beam;
    an operation mode selector; and
    a controller that switches the scanning speed of said reference beam and a readout operation of said photosensor in accordance with said selected operation mode.

2. The three-dimensional apparatus of claim 1, further including a processor which measures a three-dimensional shape of said measurement target based on the output signals from said photosensor.

3. A three-dimensional measurement apparatus comprising:
    an irradiation unit that irradiates and scans a measurement target with a reference beam;
    a photosensor for receiving light reflected from a measurement target irradiated with said reference beam;
    a reading unit that repeatedly reads out signals from said photosensor during the scanning of said reference beam;
    an operation mode selector; and
    a controller that switches a line width for the readout of said photosensor in accordance with said selected operation mode.

4. The three-dimensional apparatus of claim 3, further including a processor which measures a three-dimensional shape of said measurement target based on the output signals from said photosensor.

5. A three-dimensional measurement apparatus comprising:
    an irradiation unit that irradiates and scans a measurement target with a reference beam;
    a photosensor for receiving light reflected from a measurement target irradiated with said reference beam;
    a reading unit that repeatedly reads out signals from said photosensor during the scanning of said reference beam;
    an operation mode selector; and
    a controller that switches line spacing for the readout of said photosensor in accordance with said selected operation mode.

6. The three-dimensional apparatus of claim 5, further including a processor which measures a three-dimensional shape of said measurement target based on the output signals from said photosensor.

7. A three-dimensional measurement apparatus comprising:
    an irradiation unit that irradiates and scans a measurement target with a reference beam;
    a photosensor for receiving light reflected from a measurement target irradiated with said reference beam;
    a reading unit that repeatedly reads out signals from said photosensor during the scanning of said reference beam;
    a switching device that switches the scanning speed of said reference beam in accordance with said selected operation mode;
    a switching device that switches a line width for the readout of said photosensor in accordance with said selected operation mode; and
    a switching device that switches line spacing for the readout of said photosensor in accordance with said selected operation mode.

8. The three-dimensional apparatus of claim 7, further including a processor which measures a three-dimensional shape of said measurement target based on the output signals from said photosensor.

9. A three-dimensional measurement apparatus comprising:
    an irradiation unit that irradiates and scans a measurement target with a reference beam;
    a photosensor for receiving light reflected from a measurement target irradiated with said reference beam;
    a reading unit that repeatedly reads out signals from said photosensor during the scanning of said reference beam and thereby reading out signals output therefrom;
    a switching device that switches the line width of an effective light receiving region of said photosensor, as well as line spacing for the readout, in accordance with said selected operation mode; and
    a switching device that switches the number of lines shifted per frame for the readout of said photosensor in accordance with said selected operation mode.

10. A three-dimensional measurement apparatus as set forth in claim 9, further including a switching device that switches the readout operation between (a) skipping intermediate lines, or (b) adding together the read out signals, when the number of lines shifted per frame is more than one.

11. The three-dimensional apparatus of claim 9, further including a processor which measures a three-dimensional shape of said measurement target based on the output signals from said photosensor.

12. A three-dimensional measurement apparatus, comprising:
    an optical scanning system which scans a target object with a reference beam;
    a measuring sensor that is operable in a plurality of different operating modes to repeatedly sense an image of the target object as it is being scanned by the reference beam;
    a mode selector which selects one of said operating modes; and
    a controller which varies at least one of (a) the number of lines in an image which are sensed in a sensing operation, (b) the width of the image that is sensed in a sensing operation, and (c) the spacing between images in successive sensing operations, in dependence upon the selected operating mode.

13. The three-dimensional measurement system of claim 12, wherein one of said operating modes is a standard operating mode and another of said modes is a high-speed mode, and said controller decreases the number of lines which are sensed in a sensing operation during said high-speed mode, relative to said standard mode.

14. The three-dimensional measurement system of claim 13, wherein said controller also decreases the width of an image that is sensed during said high-speed mode.

15. The three-dimensional measurement system of claim 13, wherein said controller also increases the spacing between images in successive sensing operations during said high-speed mode.

16. The three-dimensional measurement system of claim 12, wherein one of said operating modes is a standard operating mode and another of said modes is a high-speed mode, and said controller increases the spacing between images in successive sensing operations during said high-speed mode, relative to said standard mode.

17. The three-dimensional measurement system of claim 12, wherein one of said operating modes is a standard operating mode and another of said modes is a high-range mode, and said controller increases the width of an image that is sensed during said high-range mode, relative to said standard mode.

18. The three-dimensional measurement system of claim 12, wherein one of said operating modes is a standard operating mode and another of said modes is a high-sensitivity mode, and said controller increases the width of said reference beam during said high-sensitivity mode, relative to said standard mode.

19. The three-dimensional measurement system of claim 12, wherein one of said operating modes is a standard operating mode and another of said modes is a high-resolution mode, and said controller decreases the spacing between images in successive sensing operating during said high-resolution mode, relative to said standard mode.

20. The three-dimensional measurement apparatus of claim 12, further including a processor which determines the three-dimensional shape of the target object on the basis of the images sensed by said measuring sensor.

21. A method for measuring the three-dimensional shape of an object, comprising the steps of:
scanning a target object with a reference beam;
receiving light reflected from a target by means of a photosensor as it is being scanned with said reference beam;
repeatedly driving said photosensor during the scanning of said reference beam to thereby read output signals therefrom;
selecting an operation mode; and
switching the scanning speed of said reference beam and a readout operation of said photosensor in accordance with said selected operation mode.

22. The method of claim 21, further including the step of measuring a three-dimensional shape of said measurement target object based on the output signals from said photo-sensor.

23. A method for measuring the three-dimensional shape of an object, comprising the steps of:
scanning a target object with a reference beam;
receiving light reflected from a target by means of a photosensor as it is being scanned with said reference beam;
repeatedly driving said photosensor during the scanning of said reference beam to thereby read output signals therefrom;
selecting an operation mode; and
switching a line width for the readout of said photosensor in accordance with said selected operation mode.

24. The method of claim 23, further including the step of measuring a three-dimensional shape of said measurement target objet based on the output signals from said photosensor.

25. A method for measuring the three-dimensional shape of an object, comprising the steps of:
scanning a target object with a reference beam;
receiving light reflected from a target by means of a photosensor as it is being scanned with said reference beam;
repeatedly driving said photosensor during the scanning of said reference beam to thereby read output signals therefrom;
selecting an operation mode; and
switching line spacing for the readout of said photosensor in accordance with said selected operation mode.

26. The method of claim 25, further including the step of measuring a three-dimensional shape of said measurement target objet based on the output signals from said photosensor.

27. A method for measuring the three-dimensional shape of an object, comprising the steps of:
scanning a target object with a reference beam;
receiving light reflected from a target by means of a photosensor as it is being scanned with said reference beam;
repeatedly driving said photosensor during the scanning of said reference beam to thereby read output signals therefrom;
selecting an operation mode; and
switching the number of lines shifted per frame for the readout of said photosensor in accordance with said selected operation mode.

28. The method of claim 18, further including the step of switching the readout operation between (a) skipping intermediate lines, or (b) adding together the readout output signals, when the number of lines shifted per frame is more than one.

29. The method of claim 27 further including the step of measuring a three-dimensional shape of said measurement target objet based on the output signals from said photosensor.

30. A three-dimensional measurement apparatus comprising:
an irradiator for irradiating and scanning a measurement target with a reference beam;
a photosensor for receiving light reflected from a measurement target irradiated with said reference beam;
a driver for repeatedly driving said photosensor during the scanning of said reference beam and thereby reading out signals output therefrom; and
a selector for selecting an operation mode from a plurality of operation modes, the plurality of operation modes being different from each other with respect to at least one factor of measurement time, depth of measurement, resolution, sensitivity, and measurement area.

* * * * *